US010332008B2

(12) United States Patent
Burger et al.

(10) Patent No.: US 10,332,008 B2
(45) Date of Patent: Jun. 25, 2019

(54) PARALLEL DECISION TREE PROCESSOR ARCHITECTURE

(71) Applicant: Microsoft Technology Licensing, LLC, Redmond, WA (US)

(72) Inventors: Douglas C. Burger, Bellevue, WA (US); James R. Larus, Lusanne (CH); Andrew Putnam, Seattle, WA (US); Jan Gray, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 14/216,990

(22) Filed: Mar. 17, 2014

(65) Prior Publication Data

US 2015/0262064 A1 Sep. 17, 2015

(51) Int. Cl.
*G06N 20/20* (2019.01)
*G06N 5/02* (2006.01)
(Continued)

(52) U.S. Cl.
CPC ......... *G06N 5/022* (2013.01); *G06F 16/9027* (2019.01); *G06F 16/90335* (2019.01); *G06N 20/20* (2019.01)

(58) Field of Classification Search
CPC .............. G06N 5/022; G06F 17/30961; G06F 17/30979
(Continued)

(56) References Cited

U.S. PATENT DOCUMENTS 5,146,540 A 9/1992 Natarajan
6,212,628 B1 * 4/2001 Abercrombie ...... G06F 9/30014
712/16

(Continued)

FOREIGN PATENT DOCUMENTS

CN 102902871 A 1/2013
CN 103532908 A 1/2014
(Continued)

OTHER PUBLICATIONS

Oberg, J. et al, "Random decision tree body part recognition using FPGAs." 2012 22nd Intl. Conf. on Field Programmable Logic and Applications (FPL) IEEE. (8 pages).*
(Continued)

*Primary Examiner* — Kakali Chaki
*Assistant Examiner* — Brian M Smith
(74) *Attorney, Agent, or Firm* — Arent Fox LLP

(57) ABSTRACT

A decision tree multi-processor system includes a plurality of decision tree processors that access a common feature vector and execute one or more decision trees with respect to the common feature vector. A related method includes providing a common feature vector to a plurality of decision tree processors implemented within an on-chip decision tree scoring system, and executing, by the plurality of decision tree processors, a plurality off decision trees, by reference to the common feature vector. A related decision tree-walking system includes feature storage that stores a common feature vector and a plurality of decision tree processors that access the common feature vector from the feature storage and execute a plurality of decision trees by comparing threshold values of the decision trees to feature values within the common feature vector.

18 Claims, 12 Drawing Sheets

(51) Int. Cl.
*G06F 16/901* (2019.01)
*G06F 16/903* (2019.01)

(58) Field of Classification Search
USPC .......................................................... 706/46
See application file for complete search history.

(56) References Cited

U.S. PATENT DOCUMENTS

| | | | |
|---|---|---|---|
| 8,117,137 | B2 | 2/2012 | Xu et al. |
| 2001/0018654 | A1 | 8/2001 | Hon et al. |
| 2003/0110180 | A1 | 6/2003 | Calvignac et al. |
| 2003/0120621 | A1 | 6/2003 | McDaniel et al. |
| 2003/0229630 | A1 | 12/2003 | Kamath et al. |
| 2009/0210470 | A1 | 8/2009 | Sarlos et al. |
| 2009/0281969 | A1 | 11/2009 | Andreev et al. |
| 2010/0070457 | A1 | 3/2010 | Kejariwal et al. |
| 2012/0251008 | A1 | 10/2012 | Nowozin et al. |
| 2012/0259844 | A1 | 10/2012 | Yuan et al. |
| 2013/0156298 | A1 | 6/2013 | Kohli et al. |
| 2013/0179377 | A1* | 7/2013 | Oberg ................ G06K 9/00986 706/45 |
| 2013/0185239 | A1* | 7/2013 | Dedeoglu ................ G06N 5/02 706/46 |
| 2015/0262062 | A1 | 9/2015 | Burger et al. |
| 2015/0262063 | A1 | 9/2015 | Burger et al. |
| 2015/0356376 | A1 | 12/2015 | Burghouts |

FOREIGN PATENT DOCUMENTS

| | | |
|---|---|---|
| CN | 103546441 A | 1/2014 |
| GB | 2262175 A | 6/1993 |

OTHER PUBLICATIONS

Jiang, W. et al, "Decision forest: a scalable architecture for flexible flow matching on FPGA." 2010 Intl. Conf. on Field Programmable Logic and Applications (FPL) IEEE. (6 pages).*
Farooq, U. et al., "Tree-based Heterogeneous FPGA Architectures: Application Specific Exploration and Optimization." Springer Science & Business Media, 2012. Chapter 2, 43 pages.*
Waldvogel, B., "Accelerating random forests on CPUs and GPUs for object-class image segmentation." Master's Thesis, Universitat Bonn. Jul. 18, 2013. 97 pages.*
Bhatotia, P. et al., "Shredder: GPU-accelerated incremental storage and computation" in FAST, 10th USENIX Conf. on File and Storage Technologies (2012) 14 pp.*
Jones, B. et al., "Double buffering" comment downloaded from web forum [www.fpgarelated.com/showthread/comp.arch.fpga/55681-1. php] comment dated Dec. 4, 2006. 2 pages.*
Saquib, F. et al., "Pipelined Decision Tree Classification Accelerator Implementation in FPGA," IEEE Trans. on Computers, vol. 64, No. 1, Preprint Available Oct. 18, 2013, DOI 10.1109/TC.2013.204, 6 pp. see <http://ieeexplore.ieee.org/document/6636881/>.*
Kulaga, R. et al., "FPGA Implementation of Decision Trees and Tree Ensembles for Character Recognition in Vivado HLS," Image Processing and Communication, vol. 19, No. 2-3 (2014) pp. 71-82. (Year: 2014).*

"Second Written Opinion Issued in PCT Application No. PCT/US2015/020050", dated Nov. 23, 2015, 6 Pages.
Cui, et al, "A Combination Classification Method of Multiple Decisions Trees-based on Generic Algorithm towards Customer Behavior", International Conference on Management Science and Engineering, Sep. 2008, pp. 104-108.
International Search Report and Written Opinion for International application No. PCT/US2015/020050, dated May 21, 2015, 12 pages.
Xu, et al., "Network Traffic On-Line Classification Using Decision Tree Fast Parallel Processing Strategy", Processing IEEE International Conference on Network Infrastructure and Digital Content (IC-NIDC), Sep. 2012, pp. 339-343.
Asadi, et al., "Runtime Optimizations for Tree-Based Machine Learing Models", IEEE Transactions on Knowledge and Data Engineering, Apr. 2013, 13 pages.
Van Essen, et al., "Accelerating a random forest classifer: multi-core, GP-GPU, or FPGA?", IEEE 20th Annual International Symposium on Field-Progammable Custom Computing Machines, Apr. 2012, pp. 232-239.
Xu, et al, "FPGA Acceleration of RankBoost in Web Search Engines", ACM Transactions on Reconfigurable Technology and Systems, vol. 1, Issue 19, Jan. 2009, pp. 1-19.
Xu, et al., "FPGA-based Accelerators for "Learning to Rank" in Web Search Engines", Neural Information Processing Systems, Dec. 2008 5 pages.
Yan, et al., "An FPGA-Based Accelerator for LambdaRank in Web Search Engines", ACM Transactions on Reconfigurable Technology and Systems, vol. 4, No. 3, Aug. 2011, pp. 1-19.
PCT International Preliminary Report on Patentability for International application No. PCT/US2015/020050, dated Feb. 15, 2016, 7 pages.
Office Action for U.S. Appl. No. 14/216,663, dated Jun. 29, 2016, Burger et al., "Decision Tree Threshold Coding", 29 pages.
Office Action for U.S. Appl. No. 14/216,818, Burger et al. "Decision Tree Processors", 19 pages.
Arrays—C++ Tutorials, <<https://web.archive.org/web/20131226021240/http://www.cplusplus.com/doc/oldtutorial. arrays/>>, Dec. 26, 2013.
Office Action for U.S. Appl. No. 14/216,663, dated Jan. 12, 2017, Burger et al., "Decision Tree Threshold Coding", 34 pages.
The Colombian Office Action dated Nov. 28, 2016 for Colombian patent application No. NC2016/0002623, a counterpart foreign application of U.S. Appl. No. 14/216,990.
"Office Action Issued in Chilean Patent Application No. 2294-2016", dated Feb. 14, 2018, 9 Pages.
"Office Action Issued in European Patent Application No. 15713082. 4", dated Feb. 15, 2018, 6 Pages.
Osman, Hassab Elgawi, "Hardware-Based Solutions Utilizing Random Forests for Object Recognition", In Proceedings of International Conference on Neural Information Processing, Nov. 25, 2008, pp. 760-767.
Struharik, J. R., "Implementing Decision Trees in Hardware", In IEEE 9th International Symposium on Intelligent Systems and Informatics, Sep. 8, 2011, pp. 41-46.
"Office Action Issued in Chinese Patent Application No. 201580014613. 3", dated Nov. 29, 2018, 15 Pages.

* cited by examiner

PARALLEL DECISION TREE PROCESSOR ARCHITECTURE

RELATED APPLICATIONS

The present application is related to concurrently filed U.S. application Ser. No. 14/216,818, entitled "Decision Tree Processors," the entire contents of which are hereby incorporated herein in their entirety. The present application is also related to concurrently filed U.S. application Ser. No. 14/216,663, entitled "Decision Tree Threshold Coding," the entire contents of which are hereby incorporated herein in their entirety.

BACKGROUND

A decision tree is a binary search tree comprised of decision nodes and left and right sub-trees and/or leaves. A decision node includes a decision to be made. Branches lead from a decision node to other decision nodes or to leaf nodes, and a selection of one of the branches is based on the decision made at the decision node. An example decision includes the comparison of two values, such as a feature value and a threshold value. If the feature value is less than or equal to the threshold value, then a left subtree is selected; if the feature value is not less than or equal to the threshold value, then the right subtree is selected. The branch is followed to the next node and, if the next node is a decision node, another decision is made, and so on until a branch leading to a leaf node is selected. A leaf node represents an output or an end-point of the decision tree. An example output is an output value, or a score, for the decision tree. This process is referred to as walking the decision tree.

Among other applications, decision trees are used to rank documents in document search. In one example, a decision tree is used to calculate the relevance of a particular item (e.g., a web page) to a particular search query. An initial set of candidate search result documents are obtained, and a feature vector for the candidate search result documents are produced. The feature vector represents various aspects (e.g., document statistics) of the candidate search result documents. One example of a feature is the number of times a search query word appears in the candidate document. Each decision tree node includes a threshold and a feature identifier, which can be used to look up the feature value for the candidate search result document. The decision tree is walked, and the tree-walking process eventually arrives at a leaf node and outputs the associated score. The score (or multiple scores if more than one decision tree is used) is used to determine the relevance of a candidate search result. The relative scores of multiple documents are used to rank the documents.

Besides search, decision trees have a variety of uses. Decision trees are used to implement gesture recognition, voice recognition, data mining, and other types of computations.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present description include hardware implementations of decision tree scoring, which enables faster decision tree scoring than conventional software-based decision tree scoring. On-chip architecture of the decision tree scoring system includes a plurality of decision tree processors implemented in parallel on one or more specialized or programmable logic circuits. At the top level of the on-chip architecture is a decision tree scorer (DTS) that receive feature vectors (e.g., sets of feature values) from an upstream computing system host or processing system, sends the feature vectors to a first decision tree cluster (DTC), receives scores from the decision tree clusters, and outputs the result to the host or other downstream system. At the next level of the hierarchy, a plurality of decision tree clusters (DTC) distributes feature vectors amongst themselves, and processes and propagates scores from decision tree processors to neighboring DTCs and to the DTS. The DTCs include one or more decision tree processors, and one or more feature storage tiles (FST). Feature value and threshold value compression reduce the bandwidth and storage requirements for the decision tree scoring system.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
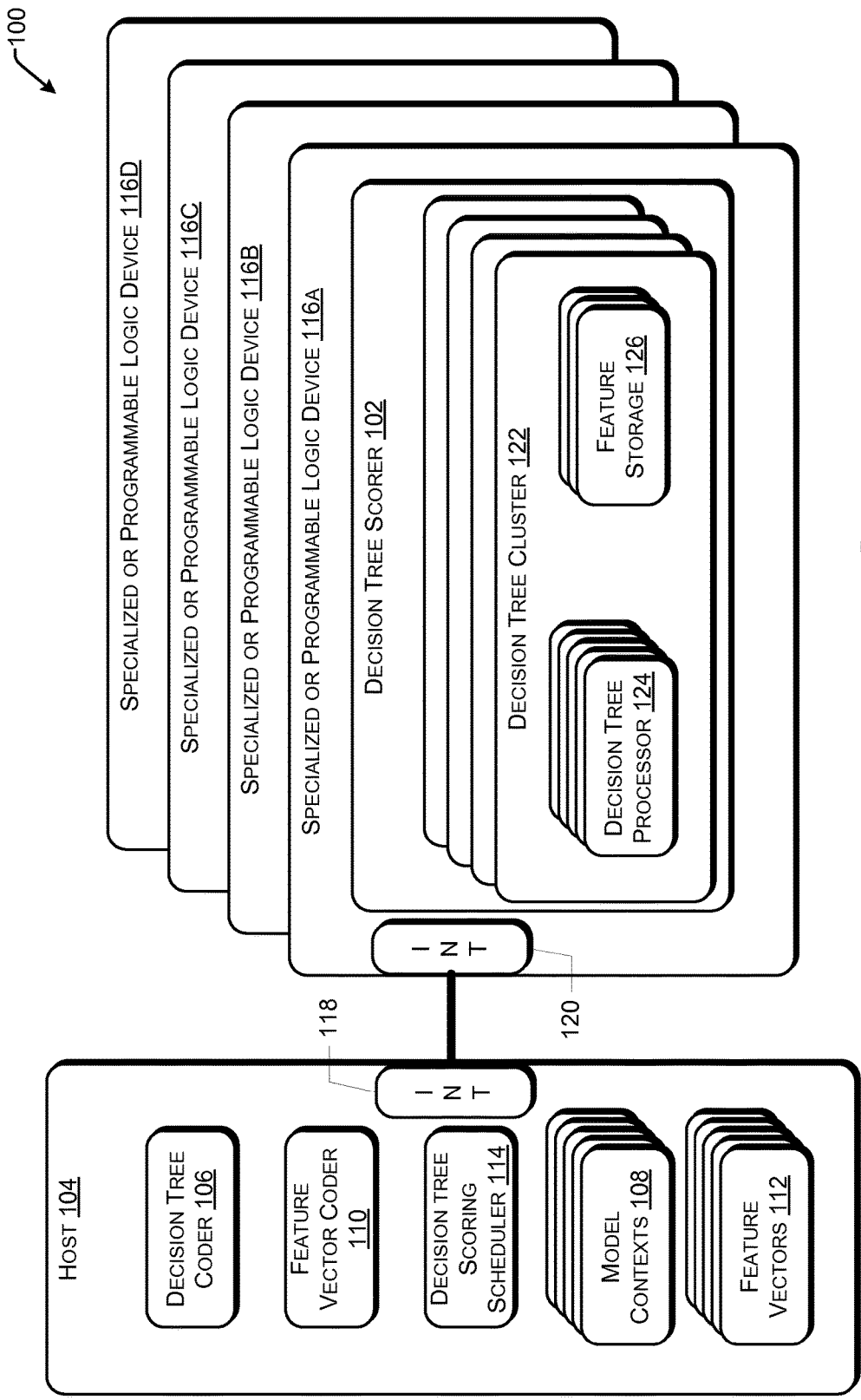
FIG. 1 is a block diagram of an example decision tree scoring system that includes one or more hardware-implemented decision tree scorers in accordance with various embodiments.

Embodiments of the present description include hardware implementations of decision tree scoring, which enables faster decision tree scoring than conventional software-based decision tree scoring. The hardware implementation includes one or more decision tree processors, implemented as circuitry, that execute decision tree programs. A decision tree program is a decision tree that has been converted to a program or other data executable by a decision tree processor. A decision tree program includes a decision tree table, which includes the various decision nodes, feature identifiers, threshold values, and output values for a decision tree. Some embodiments of decision tree processors walk decision trees in a multi-stage and/or multi-threaded fashion. In multi-threaded embodiments, each stage of the decision tree processor executes a different decision tree thread; thus an n-stage multi-threaded decision tree processor concurrently executes portions of up to n decision trees per cycle.

Embodiments include processes, systems, and apparatuses for coding, compressing, and/or compiling decision trees to be executed within a decision tree processor. In various embodiments, pointers are eliminated from decision trees by arranging the nodes such that some of the nodes with branches between them in the decision tree are adjacent to the particular node in the decision tree table. Other nodes are identified with next node data, such as offset or delta values. Leaf values are part of the decision tree node representations, rather than part of separate leaf node entries.

In some embodiments, feature value and threshold value compression reduces the bandwidth and storage requirements for a decision tree scoring system, while also increasing the size of workloads that embodiments are able to handle. In some embodiments of the present description, a sorted list is created for each threshold value that a particular feature is compared to in one or more decision trees, and threshold value indices are assigned to the threshold values. Although the total number of possible thresholds is high (e.g., represented in some embodiments by a 32-bit floating point number), the total number of actual thresholds for a particular feature in a plurality of decision trees is in practice much smaller, usually no more than 255 thresholds (although larger numbers of thresholds are possible). A dense or non-dense fixed-point small integer threshold value index is created. The threshold value index may be numbers from 0 to the total number of thresholds, and thus may be represented by a 4 bit, 8 bit, or other n-bit fixed point value. In other embodiments, the threshold value index may be negative numbers, and may include non-contiguous integer values, such as 0, 2, 4, 6, or other non-contiguous integer values. Feature values are also coded as n-bit fixed point feature value indices, such that comparisons of the threshold value indices to the feature value indices are equivalent to comparisons of the original, non-compressed threshold values to the original, non-compressed feature values.

In some embodiments, a plurality of decision tree processors is implemented in parallel on one or more specialized or programmable logic circuits. In some embodiments, the plurality of decision tree processors executes, or concurrently executes, decision trees with respect to a common feature vector. At the top level of the on-chip architecture is a decision tree scorer (DTS) that receives feature vectors (e.g., sets of feature values) from an upstream computing system host or processing system, sends the feature vectors to a first decision tree cluster (DTC), receives scores from the decision tree clusters, and outputs the result to the host or other downstream system. At the next level of the hierarchy, a plurality of decision tree clusters (DTC) distributes feature vectors amongst themselves and propagates scores from decision tree processors to neighboring DTCs and to the DTS. At the next level of the hierarchy, the DTCs include one or more decision tree processors, and one or more feature storage tiles (FST). The decision tree processors may be multi-threaded to concurrently execute multiple decision trees with respect to common feature vectors. The FST stores feature vectors to be scored against the plurality of decision trees, and in some embodiments are double-buffered to enable one set of features to be written to the FST while another set of features are accessed by the decision tree processors for scoring.

Embodiments described herein are amenable to implementation in specialized hardware such as in an ASIC, or in programmable logic device such as an FPGA. Various aspects of embodiments are also amenable to implementation in a multi-core processor, a system-on-chip (SoC) (e.g., one or more decision tree scoring cores on an SoC), and/or as a general purpose processor with an extended instruction set, and thus able to partially or wholly execute decision trees responsive to one or more atomic processor instructions. The devices, processes, and systems described herein may be implemented in a number of ways. Example implementations are provided below with reference to the following figures.

Example Decision Tree Scoring System

FIG. 1 is a block diagram of an example decision tree scoring system 100 that includes one or more hardware-implemented decision tree scorers 102 in accordance with various embodiments. A host 104 includes a decision tree coder 106 to code decision trees into model contexts 108 for execution on the decision tree scorers 102. As described in more detail below, the decision tree coder 106 represents decision trees using variable-length nodes, wherein subtree pointers are eliminated with adjacencies and offsets, leaf values are included in the node representations, and threshold values are coded as threshold index values. The decision tree coder 106 reduces the sizes of the decision trees, to enable more of them to be loaded onto the decision tree scorer 102. The decision tree coder 106 may also or alternatively compress the decision tree data (or coded decision tree data) of the model contexts 108 using other compression techniques. In these embodiments the decision tree scorer 102 or other on-chip logic is configured to decompress the compressed decision tree or coded decision tree data for scoring on the decision tree scorer 102.

The host 104 also includes a feature vector coder 110 that codes feature values within feature vectors 112 to reduce the bandwidth and storage requirements of the decision tree scorers 102, to make the feature vectors 112 compatible with the coded model contexts 108, and to place the model contexts 108 and the feature vectors 112 into a form more easily processed by specialized hardware as described in various embodiments herein. As described in more detail elsewhere within this Detailed Description, the feature vector coder 110 selects feature index values for the features such that comparisons of the feature index values to threshold index values within the model contexts 108 are equivalent to comparisons of the corresponding feature values and threshold values.

The host 104 includes a decision tree scoring scheduler 114 that schedules decision tree scoring jobs. The host 104 receives or determines that various ones of the feature vectors 112 are to be scored against various ones of the model contexts 108. An example set of decision tree scoring jobs includes:
  Feature vector 1/Model Context A
  Feature vector 2/Model Context B
  Feature vector 3/Model Context A
  Feature vector 4/Model Context B
Because it generally takes more time to load a new model context into the decision tree scorer 102 than it takes to load a new feature vector into the decision tree scorer 102, the decision tree scoring scheduler 114 rearranges the decision scoring jobs to reduce the number of times that a new model context 108 is loaded into the decision tree scorer 102. Continuing with the example above, the decision tree scoring jobs are rearranged as follows:

Feature vector 1/Model Context A
Feature vector 3/Model Context A
Feature vector 2/Model Context B
Feature vector 4/Model Context B In the field of search, a model context is a set of decision trees associated with a type of search being performed. Examples of search contexts that utilize different sets of decision trees are language (search on English-language queries may be performed using a different model context that searches performed in German-language queries), image search, news search, video search, and so forth. Other search contexts may call for separate model contexts.

The host 104 is configured to be communicatively coupled to one or more specialized or programmable logic devices 116 via datapath interfaces, such as interfaces 118 and 120. The interfaces 118 and 120 are, in various embodiments, Peripheral Component Interfaces Express (PCI-Express) interfaces, although other interface types and specifications may be used without departing from the scope of embodiments. The determination of the interface type may be based on interface bandwidth targets, which may in turn be based on the throughput targets for the decision tree scoring system 100. In a particular example, where a target processing speed is one microsecond per search document scoring, using decision tree and feature compression techniques described herein results in a bandwidth target of approximately 2-8 KB per feature vector (e.g., per candidate search result document), or approximately 2-8 GB per second. PCI-Express is suitable for this target, although other interface types and specifications may also be suitable for this or other targets. Multiple interfaces may also be used in place of a single high-speed interface without departing from the scope of embodiments.

As described in more detail below, the host 104 may be implemented as a plurality of programming instructions executable by one or more general-purpose processors of a computing system. However, one or more aspects of the host 104 may be implemented on specialized or programmable logic circuits (such as ASIC chips or FPGA chips).

The decision tree scorer 102 includes one or more decision tree clusters 122. The decision tree clusters 122 are configured to distribute the model contexts 108 and the feature vectors 112 amongst themselves. Alternatively, or in addition, the decision tree scorer 102 may include an interconnect network to pass the model contexts 108 and/or the feature vectors 112 throughout the decision tree scorer 102. The decision tree clusters 122 are also configured to process and propagate decision tree scores from neighboring decision tree clusters 122, as well as from the decision tree processors 124 within the decision tree clusters 122. The decision tree clusters 122 are configured to process the scores received from the decision tree processors 124 and neighboring decision tree clusters—which may include summing the decision tree scores—and to propagate the processed scores (e.g., the summed scores) to other neighboring decision tree clusters 122, as will be described in more detail elsewhere within this Detailed Description. The decision tree scorer 102 is configured to receive from one of the decision tree clusters 122 a final score (e.g., a scalar or a vector quantity) for the decision tree scoring job and to output the score to the host 104, or another downstream device.

The decision tree processors 124 include circuitry to execute decision trees of one or more model contexts 108, such as in parallel and concurrently against a common one of the feature vectors 112, or against the different ones of the feature vectors 112, depending on the implementation. Different ones of the feature storage 126 may store either a common one of the feature vectors 112 or different ones of the feature vectors 112. The feature storage 126 within each decision tree cluster 122 may store the same or different ones of the feature vectors 112.

As used herein, a decision tree processor 124 includes circuitry to score a decision tree. A decision tree processor 124 may include both circuitry to score a decision tree, and the decision tree code itself, embodied as a decision tree table and stored in some memory accessible to the decision tree processor 124. One or more decision tree tables may be hard-coded into the decision tree processors 124, stored on memory within the decision tree processors 124, or stored on memory that is otherwise associated with and communicatively coupled to the decision tree processors 124. The memory that the decision tree tables are stored in may be shared or dedicated storage, and may be random-access memory (RAM), flash memory, read-only-memory (ROM), or other memory type. The memory that the decision tree tables are stored on may be on-die, such as on-die memory, or may be off-chip on attached memory, such as may be communicatively coupled via a high-speed memory interface. The model contexts may be co-resident within the shared or dedicated memory. In some embodiments the host 104 may provide the model contexts 108 to the decision tree scorers 102, and/or to an on-chip or attached memory. The host 104, when scheduling a workload, may provide the decision tree scorers 102 an indication of the model context 108 that should be loaded or otherwise accessed and executed by the decision tree processors 124. In some embodiments, there may be two levels of memory that stores decision tree tables; a first level of memory (which may be on-chip or attached memory, and may be shared or dedicated to one or more decision tree processors 124) is loaded or loadable with a particular decision tree table or tables to be executed according to a current workload requirement. A second level of memory (which may be on-chip or in attached memory, shared or dedicated to one or more decision tree processors 124) may store one or more co-resident model contexts, all or portions of which are loadable onto the first level of decision tree table memory.

The host 104 may provide a common one of the feature vectors 112 to a plurality of specialized or programmable logic devices 116, and also provide decision tree tables of a single model context 108 to the plurality of specialized or programmable logic devices 116. Thus, the individual decision tree clusters 122 and decision tree processors 124 across a plurality of specialized or programmable logic devices 116 may score decision trees of a single model context 108 against a common one of the feature vectors 112. Score data from each of the plurality of specialized or programmable logic devices 116 may be propagated within each of the plurality of specialized or programmable logic devices 116 as described elsewhere within this Detailed Description, and also passed back to the host 104. In some embodiments, score data may be passed from a first specialized or programmable logic device 116 to another specialized or programmable logic device 116, which may then further propagate the score data (such as by summing or appending scores, or appending sums of scores) to produce combined score data for both specialized or programmable logic devices 116.

Other methods of processing score data are possible without departing from the scope of embodiments. For example, each decision tree scorer 102 may receive scores, or a list of sums of scores, from the decision tree processors 124 and/or the decision tree clusters 122 within the decision tree scorer 102, and provide a final summed value either to the host 104, another programmable logic device 116, or to some other downstream device. The decision tree scorer 102 may provide the lists of scores (or sums of scores) to the host 104, another programmable logic device 116, or to the other downstream device. The host 104, other programmable logic device 116, or other downstream device may perform a final scoring of the feature vector 112, such as by summing the scores or performing some other algorithm to determine a final score for the feature vector 112, such as based on score data from one or more of the of the plurality of specialized or programmable logic devices 116.

In some embodiments, the specialized or programmable logic devices 116 may be, or be included in, one or more of application-specific integrated circuits (ASIC), a programmable logic device such as a field programmable gate array (FPGA), a system on a chip (SoC), as part of a general purpose processor having a specialized portion that scores decision trees, some other logic device, or some combination of the above.

General Purpose Processor with Extended Instruction Set

In some embodiments, the instruction set architecture of a general purpose processor is extended to include decision tree traversal, scoring instructions, and state. In some embodiments, the extended instruction set includes an instruction to walk one node in a decision tree. In some embodiments, the extended instruction set includes an instruction to walk a plurality of nodes, or to walk an entire decision tree from a root (top node) to a leaf.

The state usable by a general purpose processor with an extended instruction set to traverse a decision tree includes representation of the decision tree nodes and the feature vector data. The decision tree nodes may be represented in a data structure, in executable instructions, or in some other form. As a data structure, the decision tree may be represented as a tree comprising one or more nodes, the nodes comprising feature identifiers, threshold values, and left and right subtree data, which may identify left (respectively right) subtree nodes or left (respectively right) leaf nodes or leaf score values. A particular node's data may be bundled into adjacent bytes e.g. a record or 'struct' or 'class', or may be spread across tables. Where the decision tree nodes are represented as a data structure, a tree node is identified by a data value, e.g., an index or pointer (machine address) of the node. Traversing a tree node responsive to an instruction to walk one or more nodes comprises starting with a tree node identifier, retrieving the feature it identifies, comparing it to the threshold value of the node, and using the comparison outcome to determine the tree node identifier of the left or right subtree, or right or left leaf/leaf value. In some embodiments an instruction to walk a node, referred to herein as a NODEWALK instruction, may take two parameters, for example a register containing a pointer to the tree node and a register containing a pointer to the feature vector in RAM, and may produce two values, for example, a register containing either a pointer to the left or right subtree (if not a leaf node) or containing the output value (if a leaf node), as well as a condition code register containing a flag that is set if NODEWALK has reached a leaf value (terminating the tree walk). In assembly language, a tree walk includes:

```
; load r1 with the address of the root node of the decision tree
; load r2 with the address of the feature vector
repeat:
    r1 = NODEWALK r1,r2 ; walk from one node to its left or right
    subtree
        ;node
    JNE repeat          ; repeat until a leaf is reached
    ; reached a leaf; leaf output value is in r1
```

Another embodiment of NODEWALK bundles the loop test and jump into one instruction:

```
; load r1 with the address of the root node of the decision tree
; load r2 with the address of the feature vector
repeat2:
    r1 = NODEWALKREPEAT r1,r2,repeat2 ; walk one node,
    repeat ;until
        ;a leaf is reached
    ; reached a leaf, leaf output value is in r1
```

Another embodiment walks the entire tree in one instruction:

```
; load r1 with the address of the root node of the decision tree
; load r2 with the address of the feature vector
    r3 = TREEWALK r1,r2; walk the tree
    ; leaf output value is in r1
```

In some embodiments, a decision tree is represented as a series of tree traversal instructions that are executed by a processor, which implements decision tree traversal instructions. The instructions correspond to one node in a decision tree. The instructions, represented as bit strings, comprise bit fields including a feature identifier, a threshold, and identifiers of the left and right subtree nodes and/or leaves and leaf values. In this embodiment, a tree node is identified with an instruction (machine code) address. Therefore a tree walk comprises executing a tree node walk instruction that changes program control flow to jump to the code for the left or right subtree.

For example, if a decision tree is comprised of two nodes:

```
if (feature 10 <= t1) then
    if (feature 20 <= t2) then
        score = a;
    else
        score = b;
    endif
else
    score = c;
endif
```

This might be represented by this program:
treewalk:

```
; load r2 with the address of the feature vector
root:
    r1 = NODE #10,#t1,#left,#0,#0,#c,#end,r2
left:
    r1 = NODE #20,#t2,#0,#0,#a,#b,#end,r2
end:
    ; leaf output value in r1
``` in which the NODE instructions encode:
  leaf-output-value=NODE #feature-identifier, #threshold-value, #left-subtree-address, #right-subtree-address, #left-leaf-output-value, #right-leaf-output-value, #leaf-code-address, feature-vector-address-register The # fields are 'immediate' value bit fields of the instruction.

In this embodiment a decision tree is scored by executing its first NODE instruction, which jumps to the next left or right NODE instruction, and so on, until it reaches a leaf. The root NODE instruction's bit fields encode the feature identifier (10), the threshold value (41), the left subtree ('left'), the right subtree (nil), the left leaf value (nil), and the right leaf value (c). In this example if the identified feature is less than or equal to the threshold t1, then control transfers to the second NODE instruction at address 'left'. This instruction's bit fields encode its feature identifier (2), threshold value (t2), left and right subtrees (nil), and the left and right leaf output values (a and b, respectively). If a node instruction advances to a leaf, then it transfers control to the specified address (end) and the leaf index or output value is obtained in the output register.

In other embodiments, a tree traversal instruction may use implicit registers, special purpose registers, or memory locations to identify the feature vector and the leaf-node address. Other embodiments may employ variable-length instruction encodings to compress or eliminate instruction bit fields (such as nil subtree fields) which are not used to represent a particular decision tree node. Other embodiments may take advantage of adjacency of instructions in memory to compress or eliminate bit fields (such as a left or right subtree address) in a manner similar to that described earlier.

In some embodiments, the decision tree data structure memory, or the decision tree instruction memory, may be integrated into the general purpose processor, stored externally to it, or may be coupled to external memory through a memory cache hierarchy.

A general purpose processor with decision tree traversal, scoring instructions, and state may also be coupled to a feature storage RAM. In some embodiments the feature storage RAM may be loaded automatically by a feature vector distribution network as described elsewhere within this Detailed Disclosure. In particular, new feature data may be loaded into this RAM by the feature vector distribution network without requiring execution of any instructions by the general purpose processor with extended instruction set for walking decision trees. This may save time and energy required to score a decision tree.

A general purpose processor with decision tree traversal, scoring instructions, and state may also be coupled to a score aggregation system. This may comprise additional registers, thread state, or an adder tree network, to accumulate leaf output values (scores) resulting from instructions like NODEWALK, TREEWALK, or NODE to traverse a node to a leaf node. This too may save time and energy required to score a decision tree.

Example Decision Tree Coding

Figure 2:
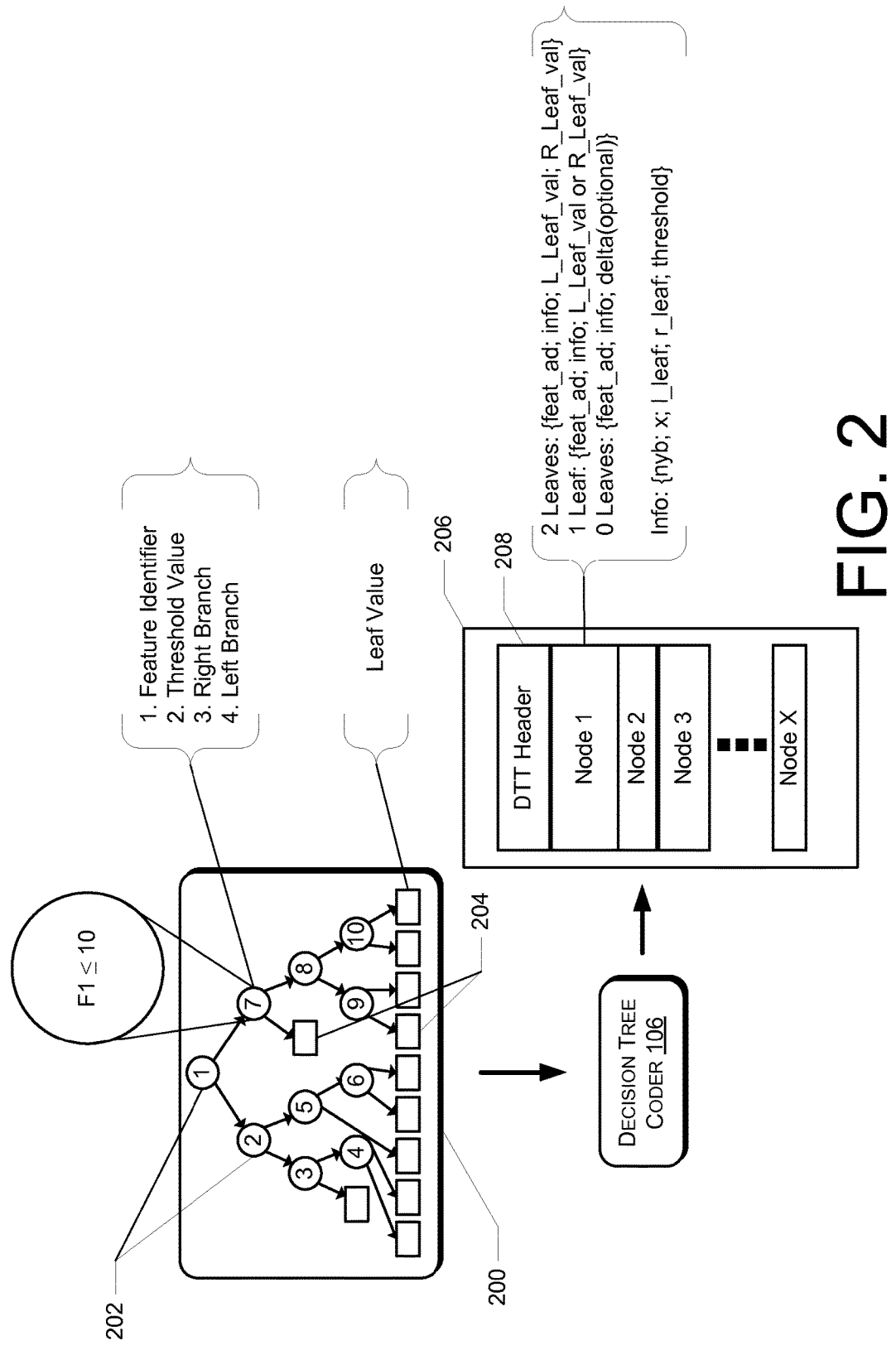
FIG. 2 illustrates decision tree coding in accordance with various embodiments of the present disclosure.

FIG. 2 illustrates decision tree coding in accordance with various embodiments of the present disclosure. An example decision tree 200 is illustrated in FIG. 2. It includes a plurality of decision nodes 202 and a plurality of leaf nodes 204. A decision node 202 includes various features, including a feature identifier, which may be an address, an index number, a reference numeral or other identifier that identifies the feature being compared at the decision node 202. The decision node 202 also includes a threshold value to which the feature value (referenced via the feature identifier) is compared. The decision node 202 also includes a left branch pointer and a right branch pointer, which indicate the locations where the next nodes are located. Each decision node 202 represents a comparison; for example node number 7 shows that feature value, identified as feature "F1," is compared to a threshold number 10. Other comparisons are possible without departing from the scope of embodiments.

Embodiments described herein refer to left branch, right branch, left nodes, right nodes, etc. But these terms are used merely for the sake of describing a decision tree. In general, a decision tree walking algorithm performs a comparison between the feature value and the threshold value and proceeds to either a first node or a second node depending on the outcome of the comparison. For ease of description, these next nodes are referred to herein as left nodes and right nodes, but this is not to be taken in a literal or limiting sense.

A leaf node 204 includes a leaf value. When a decision tree walking algorithm reaches a leaf node 204, the particular instance of walking the decision tree is complete, and the leaf value corresponding to the particular leaf node 204 arrived at is output.

The decision tree coder 106 codes the decision tree 200. The decision tree coder 106 creates a decision tree table 206 for each decision tree within a model context. In the decision tree table 206, at least some branch pointers are eliminated with adjacencies. Thus, Node 1 in the decision tree 200 is coded in the decision tree table as being prior to Node 2. Node 3 is listed after Node 2, and Node 4 is after Node 3. Thus, during the execution of Nodes 1-3 within the decision tree table 206, a decision tree processor, such as one of the decision tree processors 124, knows to select, based on the outcome of a comparison of the feature value to the threshold value, either the following adjacent node in the decision tree table 206 or another node, referred to by next node data such as an offset value, as a next node to be executed by the decision tree processors. Thus, based on the example adjacencies illustrated in FIG. 2, the outcomes of executing decision nodes of the decision tree table 206 that indicate to select the left branch result in selecting the adjacent node as the next node. Thus, where a particular decision node has a left branch that leads to another decision node (and not to a leaf node), the adjacent node in the decision tree table 206 is the next left node. Right next nodes are identified using next node data, such as offset values. Where there is no left decision node (because for example the left branch leads to a leaf node), it is possible for right next nodes to be adjacent; such right nodes may also identified by next node data, such as offset values, or they may be assumed to be adjacent.

In addition to arranging the decision nodes 202 within the decision tree table 206 based on adjacencies, the decision tree coder 106 also includes any leaf node values of leaf nodes 204 in the representation of the decision nodes 202 within the decision tree table 206. For example, Node 7 is coded by the decision tree coder 106 such that its representation includes a leaf value. Based on the outcome of the execution of Node 7 (e.g., based on the comparison of the feature value to a threshold value 10 as shown in FIG. 2), the decision tree processor selects either to output the value of the left leaf node or select node 8 as the next decision node for processing.

The decision nodes 202 are represented within the decision tree table 206 as variable length decision nodes (some are shown as being smaller than others to illustrate this). In one example, the following fields are used by the decision tree coder 106 to code the decision nodes.

2 Leaves: {feat_ad; info; L_Leaf_val; R_Leaf_val} (72 bits)

1 Leaf: {feat_ad; info; L_Leaf_val or R_Leaf_val} (48 bits)

0 Leaves: {feat_ad; info; delta(optional)} (24 or 36 bits)

All representations of decision nodes 202 within the decision tree table 206 include a feature identifier ("feat_ad") and information ("info") field. The feature identifier identifies a location within the feature storage where the feature value (which may be a feature index value as described elsewhere within this Detailed Description) to be compared to a threshold in the execution of the decision node is found. The feature identifier may be an address or other identifier that a decision tree processor uses to look up the feature value within feature storage, such as within the feature storage 126. The information field includes various sub-fields discussed in more detail below.

The two-leaf decision nodes also include a left leaf value ("L_Leaf_val") and a right leaf value ("R_Leaf_val"). These values represent possible outcomes or outputs of the decision tree 200. The one-leaf decision nodes include one of a left leaf value ("L_Leaf_val") or a right leaf value ("R_Leaf_val"). A leaf value may include various data types, including integer, fixed point, floating point, or an index that identifies a unique value stored outside of the decision tree table.

A decision node with no leaves, such as Node 2, includes an optional delta value that identifies where the right decision node is located. In this case, the left decision node is located within the decision tree table 206 at the adjacent location (e.g., for Node 2, the "left" decision node is Node 3). The right decision node is located at a location within the decision tree table 206 that is identifiable by the delta value. The decision tree processor processes the delta value to determine the right decision node value. For example, the decision tree processor may add the delta value to a location value (e.g., an index value or address) of the currently executing decision node to obtain the location value (e.g., address or index value) of the next right decision node. In some instances, the delta value is included within the info field as described in more detail below. In these instances, a separate delta value is not included within the node representation.

In an example implementation, the feat_ad field is 12 bits, the info field is 12 bits, the rdelta field is 12 bits, the left leaf value is 24 bits, and the right leaf value is 24 bits.

The info field includes various sub-fields that identify the threshold value, whether there is a left leaf, whether there is a right leaf, and encodes common offset or delta values for locating the next right node. One example of the info field is as follows:

Info: {nyb; x; l_leaf; r_leaf; threshold}

In some embodiments, the nyb field is 1-bit that identifies whether the feature value is a 4-bit or an 8-bit word (e.g., whether the feature value is a "nibble"), the x field is 1-bit, the l_leaf is 1-bit, the r_leaf is 1-bit, and the threshold is 8 bits, although other field sizes may be used without departing from the scope of embodiments. The l_leaf field indicates whether the node includes a left leaf value; likewise, the r_leaf field indicates whether the node includes a right leaf value. As noted above, the info field can be used to code the right node offset or delta value, thereby eliminating the need for a separate delta field in the node. Where x=1, the l_leaf and r_leaf fields are used to code four common offset values. In a particular example, the l_leaf and r_leaf fields are used to code offsets of 8 words, 12 words, 16 words, and 20 words (where a word=12 bits in this particular example), although other offset values may be coded without departing from the scope of embodiments. Where the offset value cannot be coded with one of the common offset values within the info field—because for example the next right node is not at a location that is one of the common offset values away from the current node—the optional separate offset delta field is used. In some embodiments, multiple decision trees are stored in one decision tree table, with appropriate coding identifying the number of decision trees and/or locations of the one or more decision trees within the decision tree table.

In some embodiments, the decision tree table 206 also includes a DTT header 208, which codes various aspects of the decision tree table 206, such as the number of decision trees contained within the decision tree table 206 and starting locations for one or more decision trees within the decision tree table 206.

Example Threshold and Feature Compression

Within a given decision tree, or within a plurality of decision trees such as within a model context 108, decision nodes include feature identifiers and threshold values. In an example decision tree node execution, a feature value (read from the feature vector at a location indexed by the feature identifier feat_ad) is compared to a threshold value. The comparison may be a determination of whether the feature value is less than or equal to a threshold value. If yes, then the left branch is selected; if no, then the right branch is selected. Other types of comparisons are possible without departing from the scope of embodiments, such as less than, greater than, or greater than or equal to. Although various examples of feature value and threshold value encoding described below assume that the decision tree comparisons include determining whether a feature value is less than or equal to the threshold value, similar coding can be performed for feature values and threshold values based on other types of decision tree comparisons without departing from the scope of embodiments.

Throughout a plurality of decision trees, a given feature $f_i$ will be referenced in one or more nodes. The nodes that reference a given feature $f_i$ will include one of one or more threshold values $tv_i$. Thus, within a given model context (e.g., one or more decision trees), and for a particular feature $f_i$, the decision tree coder 106 determines a list $ts_i$ of threshold values $tv_i$ that feature values $fv_i$ corresponding to a particular feature $f_i$ are compared to. Threshold values not compared to a particular feature $f_i$ are not included in the list for the particular feature $f_i$ (although they will be included in other lists for other features). To code the threshold values $tv_i$ for a particular $f_i$ within a model context, the following procedure is used.

Figure 3:
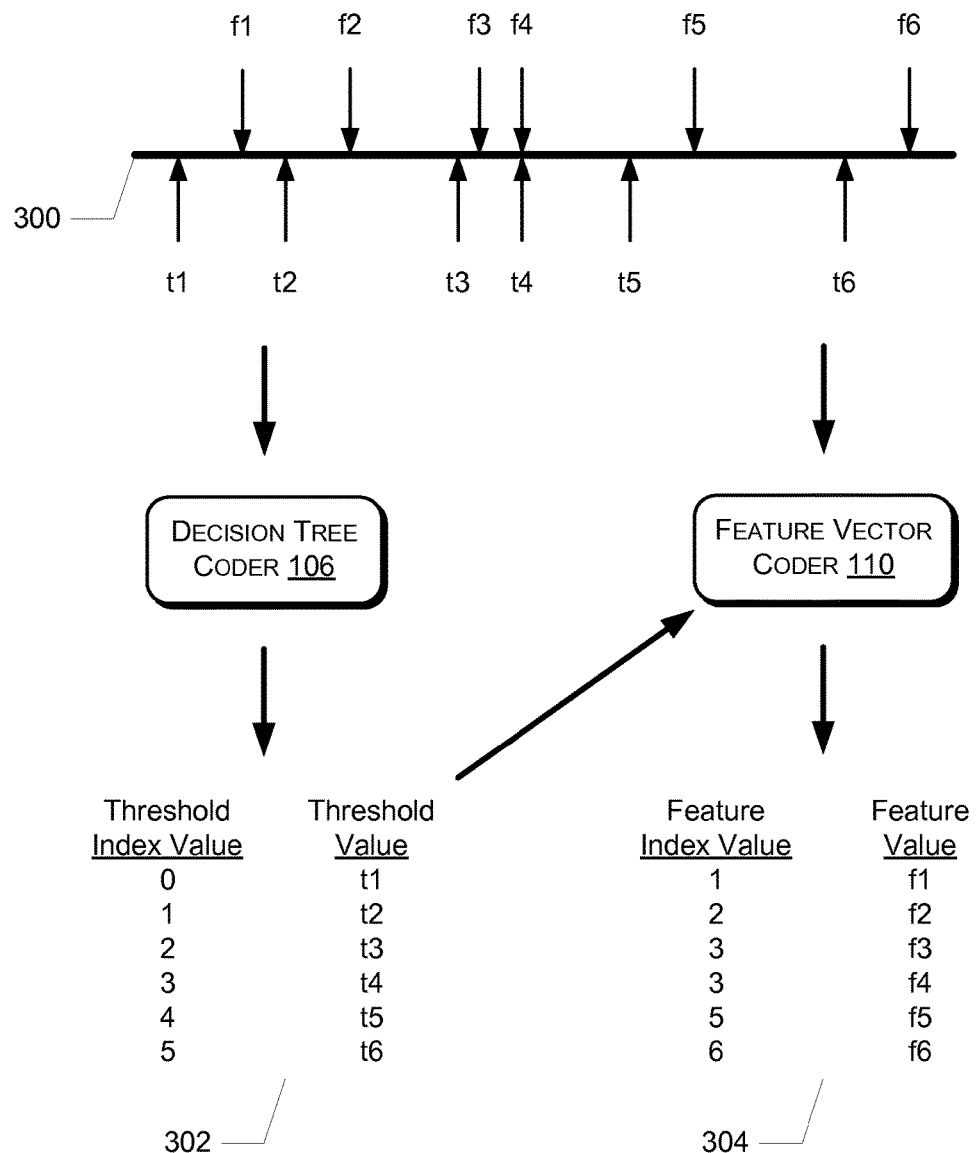
FIG. 3 illustrates an example list of unique threshold values on a real number line.

For each feature $f_i$, the decision tree coder 106 forms a sorted list $ts_i$ of all unique threshold values $tv_i$ that are included in any node of any of the decision trees of a model context that also reference $f_i$. FIG. 3 illustrates an example list $ts_i$ of unique threshold values $tv_i$ on a real number line 300. The sorted list $ts_i$ only includes unique ones of the threshold values $tv_i$; thus a particular threshold $tv_i$ appears in $ts_i$ only once, even if it is included in multiple nodes that reference $f_i$ within a given model context.

An example coding 302 for the thresholds values $tv_i$ in $ts_i$ are shown in FIG. 3. Index numbers $tvi_i$ are assigned to each unique $tv_i$ on the real number line 300 within $ts_i$ in ascending order, such that the smallest $tv_i$ is assigned index 0 and the largest $tv_i$ is assigned an index number equal to one less than the total number of unique $tv_i$ within $ts_i$. In the example shown in FIG. 3, threshold value t1 is the smallest $tv_i$, and is assigned index 0, while threshold value t6 is the largest $tv_i$ and is assigned threshold index value 5. Where the threshold values are large numbers, the assignment of fixed-point integer index values $tvi_i$ reduces the number of bits required to represent the thresholds within the decision tree node representations. For example, the threshold values $tv_i$ may be 32-bit floating point numbers (although other numbers of bits, and other types of variables, may be used without departing from the scope of embodiments), and in the example illustrated in FIG. 3, as small as a three-bit number may be used to represent the threshold index values $tvi_i$ (although other numbers of bits may be used to represent $tvi_i$, and the feature index values $fvi_i$, as is described in more detail below).

In addition to coding $tv_i$ into $tvi_i$, the feature vector coder 110 codes the feature values $fv_i$ that correspond to $f_i$ in the feature vectors 112 into feature index values $fvi_i$ such that they are compatible with the coded threshold index values $tvi_i$. Each feature vector 112 includes a list of feature values $fv_i$ for each $f_i$. In some embodiments, the feature values $fv_i$ are coded into feature index values $fvi_i$ based on the threshold index values $tvi_i$, and in particular they are coded such that outcomes of the comparisons of the threshold index values $tvi_i$ to the feature index values $fvi_i$ are equivalent to the outcomes of comparing the threshold values $tv_i$ to the feature values $fv_i$. By coding feature values this way, outcomes of the execution of the coded decision trees within the model contexts 108 against the coded feature vectors 112 produce the same outputs as conventional, software-based execution of the decision trees based on the original feature values and threshold values.

Continuing with the example illustrated in FIG. 3, execution of the decision nodes of the decision trees within the model contexts 108 are based on determining whether a feature value $fv_i$ is less than or equal to the threshold value $tv_i$. Therefore, in this example, the feature values $fv_i$ are coded into feature index values $fvi_i$ such that $fvi_i \leq tvi_i$ if-and-only-iff $fv_i \leq tv_i$ More generally, feature values $fv_i$ are coded into feature index values $fvi_i$ such that $fvi_i$ compare $tvi_i$ if-and-only-if $fv_i$ compare $tv_i$ where compare represents the comparison function performed during execution of the decision tree (e.g., one of ≤, ≥, <, or >). In the example shown in FIG. 3, feature index values $fvi_i$ are selected such that $fvi_i$ is the greatest integer such that $fv_i \leq ts_i[fvi_i]$, or else $fvi_i = \#ts_i$ if $f_i > ts_i[\#ts_i - 1]$.

where $\#ts_i$ is the total number of threshold values $t_i$ associated with a particular feature $f_i$ within a particular model context (e.g., all threshold values $tv_i$ in nodes that reference feature $f_i$). Stated another way, feature index values $fvi_i$ are selected to be either (1) the threshold index value $tvi_i$ that corresponds to the smallest one of the threshold values $tv_i$ that is greater than or equal to the feature value $fv_i$, or if all threshold values $tv_i$ are smaller than the feature value $fv_i$, (2) a number that is greater than the largest threshold index value $tvi_i$. In the example shown above, the corresponding $fvi_i$ is selected to be a number equal to the total number of threshold values $tv_i$, which is one larger than the largest $tvi_i$; however, any number larger than the largest $tvi_i$ may be selected.

In the example illustrated in FIG. 3, the feature vector coder 110 codes example features f1-f6 as coding 304. With respect to feature f1, t2 is the smallest $tv_i$ that is greater than or equal to f1, and thus the feature index value $fvi_i$ for f1 is set to be the same as the $tvi_i$ for t2 (i.e., 1). With respect to feature f6, no $tv_i$ is greater than or equal to f6; thus the $fvi_i$ for f6 is set to a number greater than the largest $tvi_i$. In the example shown in FIG. 3, the $fvi_i$ for t6 is set to 6, which is one greater than the largest $tvi_i$, 5. Also, in the example shown in FIG. 3, f4 is coded as 3.

The number of bits selected to code the $tv_i$ and the $fv_i$ associated with a particular fi is, in embodiments, large enough to accommodate $\#ts_i$ (the total number of unique $tv_i$ associated with decision nodes that reference $f_i$). In some embodiments, one of a set of possible index lengths is used to represent $tv_i$ and $fv_i$, which reduces the complexity of coding $tv_i$ and $fv_i$. In one particular example, $tv_i$ and $fv_i$ are coded as either 4-bit words, 8-bit words, or as multiple 8-bit words, although other word lengths may be used without departing from the scope of embodiments. In a particular example, the index word lengths are selected such that If $\lg(\#ts_i) < 4$, recode $tv_i$ and $fv_i$ into 4 bits, where $\lg(x)$ is the logarithm of x to the base-2.

Else if $\lg(\#ts_i) < 8$, recode $tv_i$ and $fv_i$ into 8 bits

Else recode any $tv_i$ and $fv_i$ with $\#ts_i > 255$ threshold comparisons as $(\#ts_i)/255$ separate $f_i$ Where $f_i$ is recoded into $(\#ts_i)/255$ separate $f_i$, the decision nodes are recoded by the decision tree coder 106 to indicate one of the $(\#ts_i)/255$ separate $f_i$, and the corresponding threshold values $tv_i$ of the nodes are recoded accordingly. In a specific example, an $f_i$ with 1259 total $tv_i$ within $ts_i$ results in nodes associated with the particular $f_i$ being recoded into one of five different nodes, each with a separate $f_i$ and 8-bit thresholds. Thus, $fvi_i = 0$ is coded as (0, 0, 0, 0, 0) (e.g., is coded as 0 for all of the separate $f_i$ that the original $f_i$ is broken into); $fvi_i = 255$ is coded as (255, 0, 0, 0, 0) (e.g., 255 for the first of the separate $f_i$ and 0 for all others of the separate $f_i$); $fvi_i = 256$ is coded as (255, 1, 0, 0, 0) (e.g., 255 for the first of the separate $f_i$, 1 for the second separate $f_i$, and 0 for all others); $fvi_i = 1258$ is coded as (255, 255, 255, 255, 238). Threshold values $tv_i$ for the separate $f_i$ are also coded in a similar way.

Parallel Architecture

Figure 4:
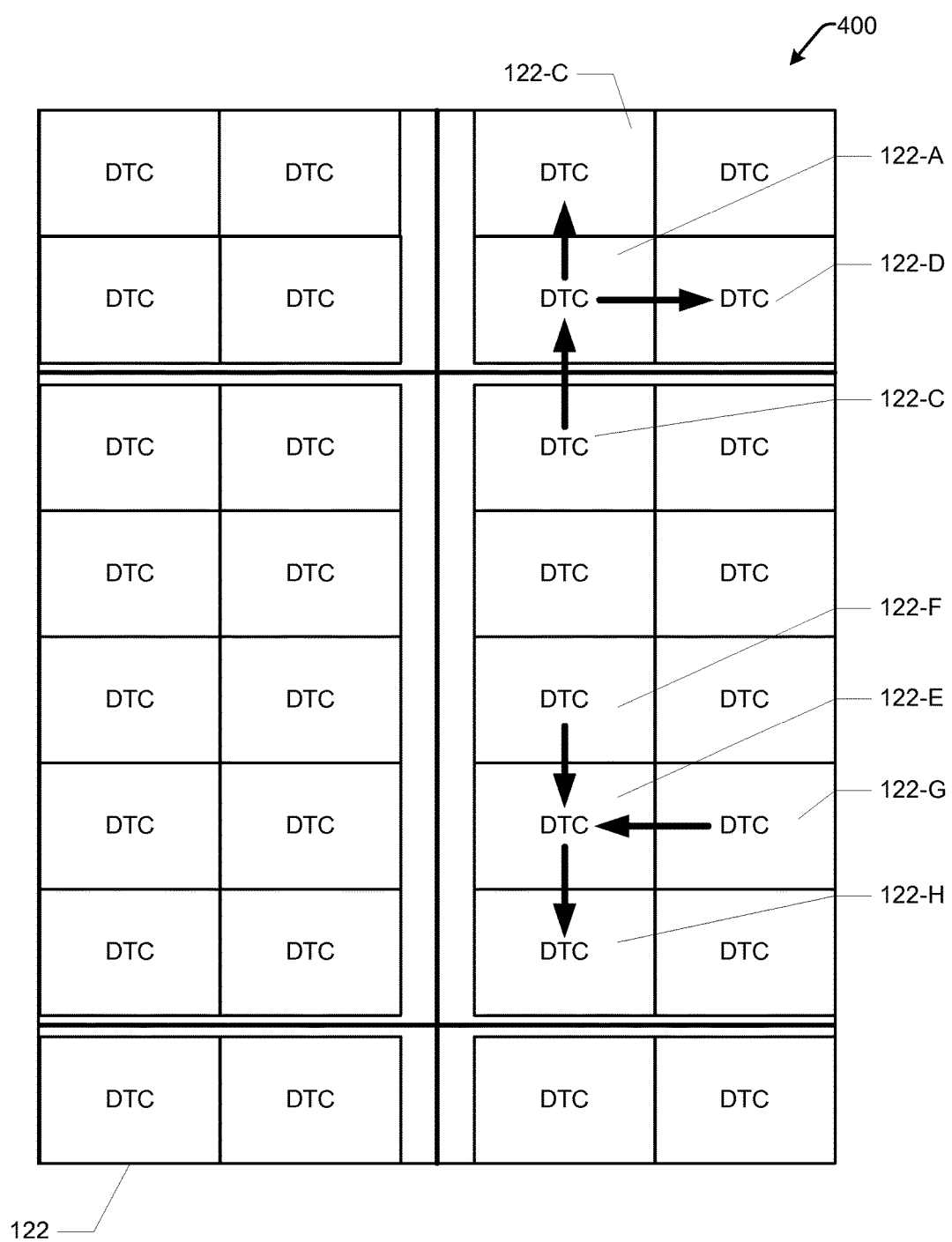
FIG. 4 illustrates an example architecture of the decision tree scorer in accordance with various embodiments.

FIG. 4 illustrates architecture 400 of the decision tree scorer 102 implemented on a specialized integrated circuit or a programmable integrated circuit in accordance with various embodiments. The architecture 400 includes a plurality of decision tree clusters (DTC) 122 arranged in a grid. The DTCs 122 are configured to receive model contexts 108 and feature vectors 112 from the decision tree scorer 102. The DTCs 122 include subsets of a plurality of decision tree processors 124 and subsets of feature storage 126. The subsets of decision tree processors 124 may be loaded and/or loadable with the same or different decision tree tables as other subsets of the decision tree processors, and the subsets of the feature storage 126 may be loaded or loadable with the same or different feature vectors (e.g., they may be loaded with common feature vectors).

The DTCs 122 may receive the feature vectors 112 from first neighboring DTCs 122 and distribute them to second neighboring ones of the DTCs 122. In one example, DTC 122-A is configured to receive feature vectors 112 from DTC 122-C, and to distribute those feature vectors 112 to DTCs 122-C and 122-D as illustrated by the arrows in FIG. 4.

Likewise, the DTCs 122 may receive score data from first neighboring DTCs 122 and propagate them to second neighboring ones of the DTCs 122. The score data may be based on individual decision tree scores, as output by different ones of the decision tree processors 124 (such as against a common feature set). The score data may a list of scores, a sum of the scores, or some other score data that is based on the individual scores (such as a multiplication of the individual scores, or some other algorithm for processing scores). The lists of scores may be lists of scores from individual decision tree outcomes, or lists of processed scores. For example, all scores from a particular decision tree cluster 122 may be summed, and appended to a list of all DTC 122 scores such that a final score data includes a list of summed scores from each DTC 122. In another example, all scores from decision trees executed by a single decision tree processor 124 may be summed, and the summed scores from all decision tree processors may be listed in a final score data, and so forth. Other ways of propagating the score data may be used without departing from the scope of embodiments. In some embodiments, processed or raw score data from each DTC 122, groups of DTCs 122, decision tree processors 124, groups of decision tree processors 124, individual decision trees, group of decision trees are provided to the DTS 400 in some other fashion (such as on a separate output network), and not propagated to neighboring DTCs 122 as described herein.

In the example shown in FIG. 4, DTC 122-E is configured to receive score data from neighboring DTCs 122-F and 122-G. The DTC 122-E is configured to receive score data from neighboring DTCs 122-F and 122-G along with score data provided by the decision tree processors (such as the decision tree processors 124) within DTC 122-E, process the score data to determine combined score data (such as by summing the scores, appending the scores to a list of individual scores, or processing the score data in some other way), and to pass the combined score data to neighboring DTC 122-H, which performs similar functions, and so on until all scores are propagated to a final one of the DTCs 122, which passes the final score data to the DTS 102. More generally, the DTCs 122 are configured to propagate score data such that scores are not double counted. For example, a particular pattern of score propagation through the DTS 102 avoids any one of the DTCs 122 from receiving two scores from two neighboring DTCs 122 into which the same scores have been processed.

In some embodiments, loading a model context into the decision tree scorer architecture 400 includes loading different decision tree tables into different ones of the decision tree tiles within the DTCs 122, including a plurality of decision trees distributed throughout the decision tree processors of the DTCs 122 of the decision tree scorer architecture 400. In these embodiments, each of the decision trees loaded into the DTCs 122 produces a separate score based on a common feature vector.

In some embodiments, different decision tree tables loaded at the same time into the decision tree architecture 400 may be part of a single model context 108, or part of different model contexts 108. In some embodiments, multiple decision tree models are coded into a single model context. In one example, two models may be similar but have some differences. The decision trees for the two models are modified slightly to introduce new decision nodes that select either model 1 or model 2. In addition, appropriate features into the feature vectors to select for either model 1 or model 2.

In some embodiments, loading a feature vector into the decision tree scorer architecture 400 includes loading the same feature vector values into each of the feature storage tiles of the DTCs 122. Thus, the plurality of decision trees of the DTCs, which in embodiments are different from one another, are scored against the same set of features, with all scores processed (e.g., summed) and propagated back to the DTS 102.

In other embodiments, various ones of the DTCs 122 are loaded with the same decision trees, such that they execute the same decision trees as other ones of the DTCs 122. Different feature vectors may be loaded into different ones of the DTCs such that the decision trees are executed against different feature vectors. In some embodiments, the DTCs 122 are loaded with different feature vectors and the same decision tree, or group of decision trees, are loaded into the decision tree scorer architecture 400. In these embodiments, each DTC 122 is loaded with a different group of one or more feature vectors. The decision trees are scored against the feature vectors and scores are accumulated over time for the feature vectors as all decision trees of a model context are flowed past the feature vectors and executed. In these embodiments, the DTCs 122 may be configured to hold scores for the feature vectors until all decision trees of the model context are loaded and executed against the feature vectors; alternatively, individual decision tree scores are transmitted to the host 104, which accumulates and processes scores for a particular feature vector.

In still other embodiments, different groups of the DTCs 122 are loaded with different decision tree jobs (e.g., combinations of model contexts and feature vectors). Thus, a first portion of the decision tree scorer architecture 400 determines scores for a first feature vector against a first model context, a second portion of the decision tree scorer architecture 400 determines a score for a second feature vector against a second model context, and so on with an Nth portion of the decision tree scorer architecture 400 determining a score for an Nth feature vector against an Nth model context. In these embodiments, the DTCs 122 of each portion are loaded with decision trees of a model context, and feature vectors distributed one-by-one within the portions for scoring, or the DTCs 122 of each portion are loaded with different feature vectors, and the decision trees of the model context are distributed one-by-one within the portions for scoring.

The number of DTCs 122 within the decision tree scorer architecture 400 can scale up to an arbitrarily large number, depending on the size and capabilities of the integrated circuit onto which the decision tree scorer architecture 400 is implemented.

In some embodiments, more than one decision tree scorer architecture 400 is utilized, each with its own set of DTCs 122 executing in parallel. In these embodiments, a single model context may be loaded onto DTCs 122 of one or more chips, and feature vectors distributed to the DTCs 122 of the different chips one-by-one for scoring. In other embodiments, different feature vectors are loaded into the DTCs 122 of the different chips, with different decision trees of the model contexts distributed one-by-one into each of the DTCs 122 for scoring. In various other embodiments, combinations of these approaches may be utilized for different portions of the combined multi-chip decision tree scorer architecture 400.

In some embodiments, determining an overall or combined score for the model context loaded into the decision tree scorer architecture 400 is based on an associative function, such as addition or multiplication, where the order in which the scores are grouped is not determinative of the outcome. Thus, the distribution of the decision trees within ones of the DTCs 122 is not necessarily important to producing the correct final or combined score for a particular feature vector against the decision trees of the model context loaded into the architecture 400. In other embodiments, processing of the scores for a feature vector and model context decision tree scoring job is not associative, and an order in which the decision trees and/or feature vectors are distributed throughout the architecture is important for determining the final or combined score for a particular feature vector.

Feature vectors 112, decision tree tables of a model context 108, and/or score data may be distributed to DTCs 122 and/or decision tree processors 124 via one or more networks, internal to the specialized or programmable logic devices 116. One or more of the DTCs 122, the decision tree processors 124, and the various feature storages 126 may be addressable via packet headers. Regardless of the distribution method for decision tree tables that are loadable into shared or dedicated storage for the decision tree processors 124, the decision tree tables may be individually transmitted (such as via packets) and addressed to ones of the DTCs 122 or decision tree processors 124, or the decision tree tables may be distributed together. Logic within the host 104 and/or the decision tree scorer 102 may determine a distribution of the individual decision tree tables amongst the DTCs 122 and the decision tree processors 124. Furthermore, the DTCs 122 may include logic to distribute decision tree tables to individual ones of the decision tree processors 124.

FIG. 4 illustrates an example of a network to distribute scores and feature vectors to the decision tree processors of the on-chip multi-processor system. In particular, the DTCs 122 act as network elements to aggregate/process the score data and feature vectors. In other embodiments, other network types are employed to distribute the scores and/or the feature vectors to the decision tree processors and/or the feature storage. In these other embodiments, the decision tree clusters 122 may or may not be included as part of the architecture. In one embodiment, the decision processors may be arranged in a mesh of decision tree processors, and scores and/or feature vectors may be distributed via the decision tree processors directly, and eventually to the decision tree scorer or other score aggregation element. In other embodiments, a broadcast network—which may be bus, mesh, point-to-point, hub-and-spoke, or other topology—may connect the decision tree processors (and/or decision tree clusters 122) to the decision tree scorer or other element that provides the feature vectors and/or receives/accumulates/processes scores from the decision tree processors. In other embodiments, a network on a chip (NOC), which may have other purposes such as to distribute configuration data to FPGA elements or other function, may be re-used to distribute feature vectors and/or provide score data from the decision tree processors to the decision tree scorer or other score aggregation element.

A score aggregation element may receive and accumulate score data from the decision tree processors and/or the decision tree clusters 122. The score aggregation element may process the score data, which may include summing the score data, appending the score data to a list or vector of scores, perform some other algorithm to compute a score based on the received data, and so forth. The score aggregation element may pass the score data, either processed or in raw form, to a host or other downstream element.

Embodiments may include separate networks, one for score data and the other for feature vectors. Thus, in different embodiments, a network may be a feature network, a score aggregation network, or both. In some embodiments, decision tree clusters 122 may act as network elements for one or both the feature network or the score network. Other examples are possible without departing from the scope of embodiments.

Figure 5:
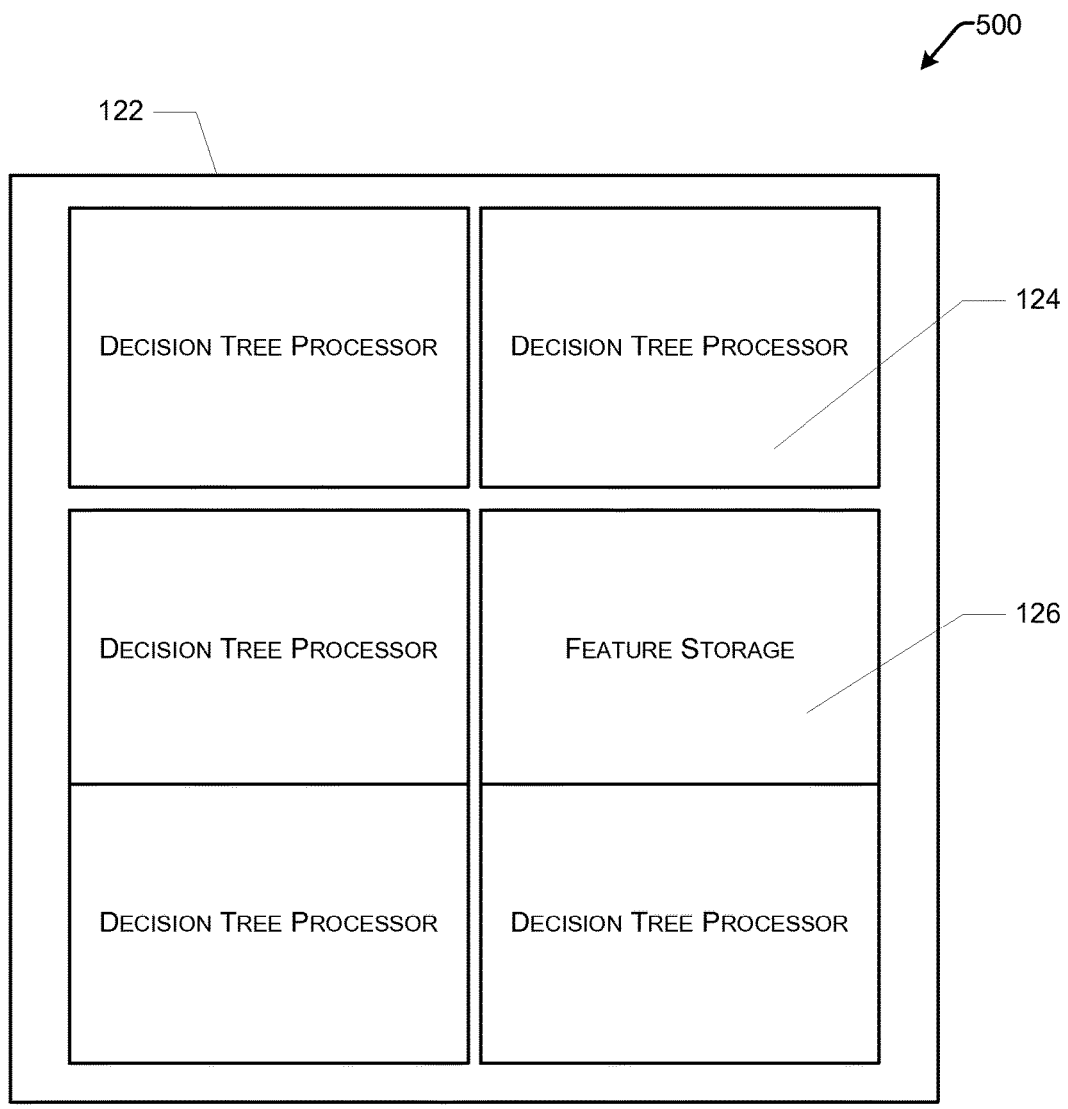
FIG. 5 illustrates an example architecture of a decision tree cluster in accordance with various embodiments.

FIG. 5 illustrates architecture 500 of a decision tree cluster 122 implemented on a specialized integrated circuit or a programmable integrated circuit in accordance with various embodiments. The architecture 500 includes one or more decision tree processors 124 and one or more feature storages 126. The example architecture 500 illustrated in FIG. 5 includes five decision tree processors 124 and one feature storage 126, although other numbers of decision tree processors 124 and feature storages 126 are used in various other embodiments.

The DTC 122 includes a feature input bus register to receive feature vectors for storage in the feature storage 126, for example a 64-bit feature input bus register. The DTC 122 includes a score output register to accumulate and output hold scores for output to neighboring ones of the DTC 122, for example a 33-bit fixed point score output register. An adder tree of the DTC 122 totals the scores from the decision tree processors 124 and from one or two or more neighboring DTCs 122. The Decision tree processors 124 output done flags when all decision tree threads being executed therein have completed and output scores. The DTC 122 accumulates the done flags, and upon the adder tree adding the scores from neighboring DTCs 122 to the scores from the decision tree processors 124, the DTC 122 outputs the scores to one or more neighboring DTCs 122. At this point, the DTCs 122 also output completion signals to their upstream DTCs 122, such as through a completion signal network, which may be the same as or different from interconnect networks within the DTS 102 to distribute feature vectors, score data, and/or decision tree table data. In the case of a final DTC 122, the scores and completion signals are output to the DTS 102. Upon receiving completion signals, the DTCs 122 and the decision tree scorer 102 determines that the upstream DTCs 122 have completed their decision tree execution and that all available scores are received on an input bus, that no more scores are waiting to be received, and that the scores are ready to be added to scores of the decision tree processors 124 and propagated to downstream DTCs 122 and/or the decision tree scorer 102.

The feature storage 126 is, in some embodiments, double-buffered to enable one set of features to be loaded into the feature storage 126 while another set of features is read by the decision tree processors 124. In one example, the feature storage 126 includes two 32-bit write ports, enabling the feature storage 126 to retire 64 bits of features data at 250 MHz. In one example, the feature storage 126 includes two 32-bit read ports to enable the feature storage 126 to receive two 8-bit features per cycle. The feature storage 126 receives a feature identifier from the decision tree processors 124 and responds with a feature value, for example an 8-bit feature value, and a flag.

In some embodiments, storage space on the feature storage 126 is reduced by selective capture of subsets of the feature vectors that are used by the decision tree processors 124 of the particular decision tree cluster 122. Not all features within the feature vectors 112 will be referenced by the decision trees of a particular decision tree cluster 122; thus, the storage space on the feature storage 126 is reduced, in some embodiments, by only capturing those feature values that are actually referenced by the decision trees executed by decision tree processors 124 of the particular DTC 122. Thus, the portions of the feature vectors to be stored by a particular feature storage 126 may be referenced in a packet addressed to the feature storage 126, or to the DTC 122 that the particular feature storage 126 is included in. The feature storage 126 may be provided with a mask, such as in a packet addressed to the feature storage 126 or the DTC 122, that identifies the portions of the feature vector to selectively store.

As will be described in more detail below, the decision tree processors 124 are multi-threaded tree-walking engines, capable of executing a plurality of decision trees. The decision trees are stored as decision tree tables within the decision tree processors 124. In various embodiments, the decision tree tables are stored on various memory storage types, such as random access memory, including Dynamic Random Access Memory (DRAM), Block Random Access Memory (BRAM), Static Random Access Memory (SRAM), and so forth. In some embodiments, the decision tree processors 124 include a five-stage pipeline as is described in more detail below; thus, as long as there are at least five runnable threads (corresponding to five decision trees whose execution have not yet completed), the decision tree processor 124 is able to initiate walking one node of a decision tree on each clock cycle.

Multi-Stage Tree-Walking Pipeline

Figure 6:
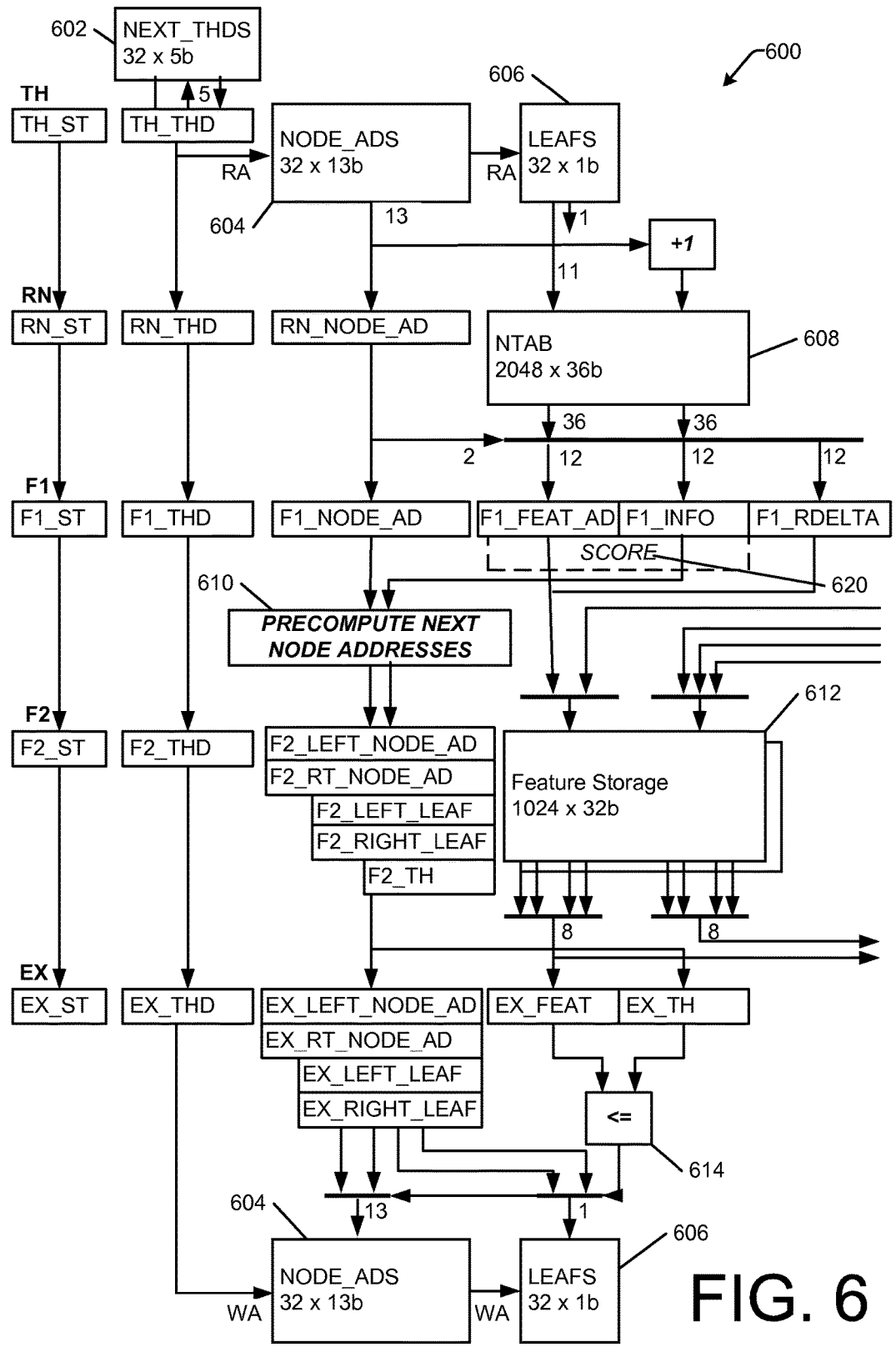
FIG. 6 illustrates a multi-stage, multi-threaded, pipelined tree walking implementation of a decision tree processor, in accordance with various embodiments.

In some embodiments, the decision tree processors include a pipelined architecture. FIG. 6 illustrates a multi-stage, multi-threaded, pipelined tree walking circuit 600 of a decision tree processor, in accordance with various embodiments. The circuit 600 is implemented on logic circuitry within the decision tree processor. A thread circuit (or thread stage) (denoted "TH" in FIG. 6) receives a next thread TH_THD from a NEXT_THDS table 602. In the example illustrated in FIG. 6, the NEXT_THDS table 602 is 32×5 bits, and thus stores up to 32 5-bit next thread numbers; therefore up to 32 threads can be handled by the circuit 600. The NEXT_THDS table 602 is a linked list of threads; initially all threads are listed in the NEXT_THDS table 602; as threads complete (by outputting a leaf value), the threads are de-linked from the NEXT_THDS table 602. Once all threads are de-linked from the NEXT_THDS table 602, the decision tree processor outputs a completion signal to the decision tree cluster, indicating that it is finished with all threads. The thread circuit uses the next thread identifier from the NEXT_THDS table 602 to issue a read for the next node address of the next thread from a node address table, NODE_ADS table 604 and a leaf table, LEAFS table 606. The NODE_ADS table 604 is 32×13 bits, and thus stores up to 32 13-bit next node addresses, one for each thread.

The LEAFS table 606 stores leaf output flags; where an entry for a particular thread within the LEAFS table 606 stores an output flag (e.g., a 1 or a 0), the leaf value is output to the decision tree cluster and the thread is de-linked from the NEXT_THDS table 602.

Where the leaf output flag indicates that no leaf value is previously selected, the next node addresses are passed to the read node circuit (or read stage) (denoted "RN" in FIG. 6), and a read to the node table NTAB 608 that corresponds to current thread is issued by the circuit 600 for the next node descriptor. In embodiments, the NTAB 608 is stored on dedicated memory within or otherwise associated with the circuitry of decision tree processor. In other embodiments, the NTAB 608 is stored in a memory that is separate from and communicatively coupled to the decision tree processor. In some embodiments, the NTAB 608 is stored in a memory shared by a plurality of decision tree processors.

The 12-bit feature address F1_FEAT_AD and 12-bit info field F1_INFO of the node descriptor, along with next node data, such as an offset value if present in the NTAB 608, are read out in the F1 feature circuit (or F1 feature stage) of the circuit 600. For example, the next left and right node addresses and next left and right leaf flag values are pre-computed by logic 610 at this stage and are a function of the node address, the info field, and the optional rdelta offset field. The info field determines whether the node one, two, or zero next subtree nodes, and whether there are one, two, or zero leaf values. The next left and right next node addresses are pre-computed based on adjacencies within the NTAB 608 the F1_RDELTA value, if present, or from the coding of the offset value in the info field, as described elsewhere within this Detailed Description. In some embodiments, when the current node has a left subtree node, the next left node address is the address of the node adjacent to (immediately following) the current node, and the next left leaf flag is false. Otherwise the current node has a left leaf output value, and the next left node address the address of the word(s) within the current node that contain the left leaf value, and the next left leaf flag is true. The pre-computation is similar for the next right node address and next right leaf flag. When the current node has a right subtree node but no left subtree node, the next right node address is the address of the node adjacent to (immediately following) the current node, and the next right leaf flag is false. When the current node has both a left subtree node and a right subtree node, the next right node address is determined by adding the current node address and an offset (whose value is encoded within the info field, or explicitly represented in the optional rdelta offset field), and the next right leaf flag is false. Otherwise the current node has a right leaf output value, and the next right node address the address of the word(s) within the current node that contain the right leaf value, and the next right leaf flag is true.

At the F2 feature circuit (or F2 feature stage) of the circuit 600, the feature value associated with the F1_FEAT_AD is read from the feature storage 612 (e.g., the feature storage 126). The FST 126, in embodiments, is configured to be read by two different decision tree processors; thus the feature storage 612 is shown having two inputs and two outputs.

At the execution circuit (or execution stage) of the circuit 600 (denoted "EX" in FIG. 6), the feature value ("EX_FEAT") read from the feature storage 612 is compared by logic 614 to the threshold value (EX_TH) of the currently executing node. The threshold value EX_TH and the feature value EX_FEAT may be threshold index values and feature index values as is described elsewhere within this Detailed Description, or they may be uncompressed threshold values and feature values. Embodiments of the present disclosure are not limited to use of one or the other. Based on the outcome of the compare output by the logic 614, either a next left node address or a next right node address is written to the thread's entry in the NODE_ADS table 604 Also based on the outcome of the compare output by the logic 614, either a next left leaf flag or a next right leaf flag is written to the thread's entry in the LEAFS table 606.

Once the execution circuit selects a leaf value for a particular thread and sets a leaf flag, then the next time the thread is issued into the pipeline, the leaf flag is read and the node address in the NODE_ADS table 604 is not the address of a node but rather the address of leaf value words within previous node within the NTAB 608. At the RN circuit, these leaf value words are read from the NTAB 608, thereby obtaining the leaf value's score 620 for the particular thread instead of a feature address and info field. The score 620 may be output to the decision tree cluster as described elsewhere within this detailed description. In addition, when the leaf flag is true, the thread is unlinked from the NEXT_THDS table 602 so that it is not fetched by the pipeline again.

Each of the portions of the circuit 600 (TH, RN, F1, F2, and EX) concurrently processes different ones of the threads. Thus, at any one time, the circuit 600 processes some portion of up to five different threads, which corresponds to processing some portion of up to five different decision trees concurrently, every clock cycle.

Example Processes

Figure 7:
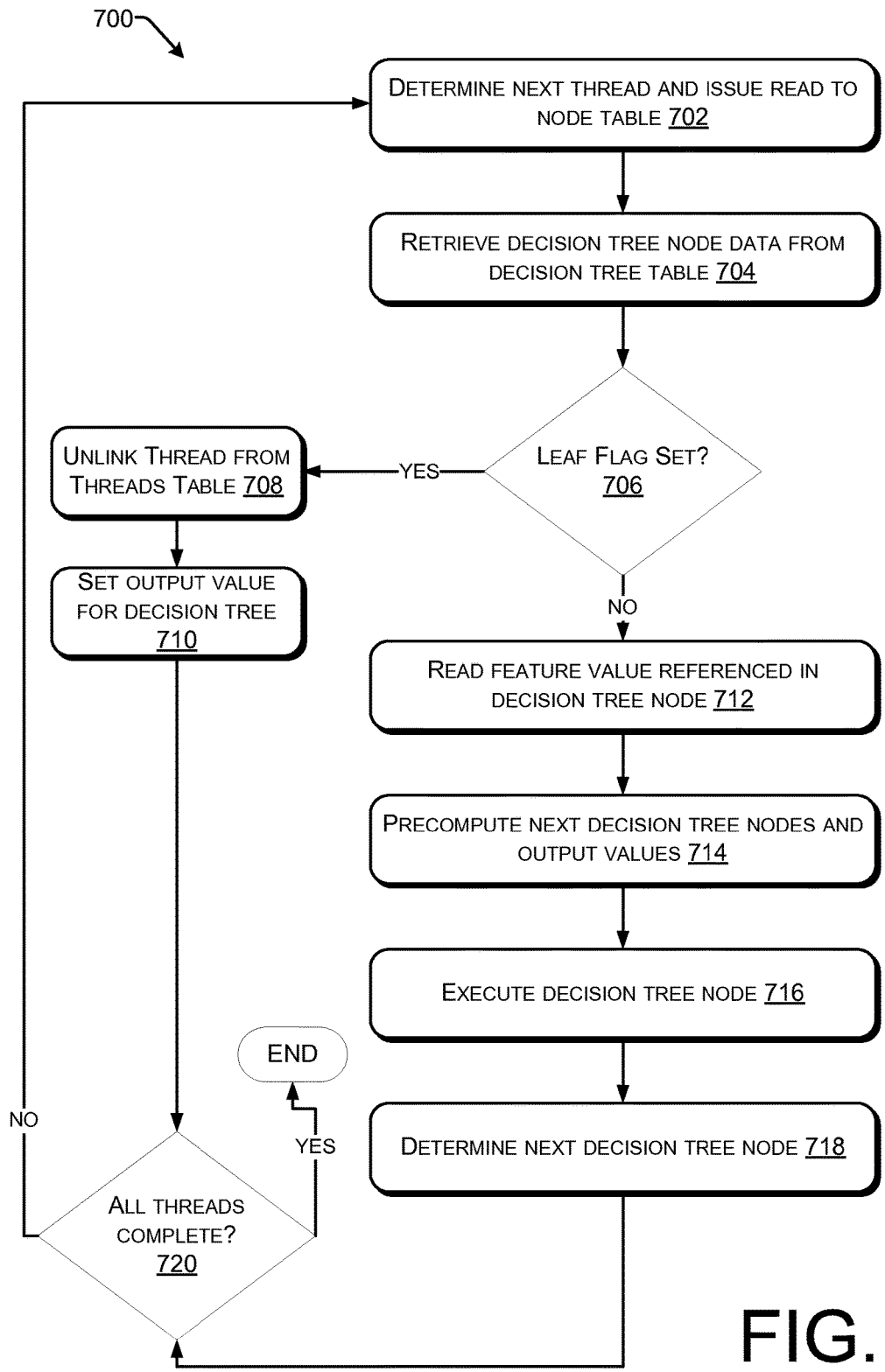
FIG. 7 depicts a flow graph that shows an example process of executing a decision tree node, in accordance with various embodiments.

FIG. 7 depicts a flow graph that shows an example process 700 of executing a decision tree, in accordance with various embodiments. At 702, a decision tree processor, e.g., a thread circuit or stage of a decision tree processor pipeline, determines a next thread to be executed by the processor and issues a read to the node table to determine the next node address of the next thread.

At 704, a decision tree processor, e.g., a read node circuit or stage of a decision tree processor pipeline, retrieves decision tree node data, such as decision tree node words, including at least feature indicators and threshold values, from a decision tree node table, which may be stored within the decision tree processor. A subset of the decision tree nodes also includes next node data, such as next node offset values.

Final outcomes of the decision tree node executions result in output of leaf values as an output of the decision tree-walking thread, such as where a decision tree node execution results in selecting a left leaf or a right leaf value. At 706, the decision tree processor, e.g., a read circuit or stage of a decision tree processor, determines whether a leaf flag is set for a particular thread, such as during a previous pass of the thread through a pipeline. Where the leaf flag is set, at 708 the particular thread is unlinked from the threads table. At 710, leaf value data, such as one or more leaf value words, of the decision tree node are read by the read node circuit or stage of the decision tree processor pipeline and output to the decision tree cluster, or to some other output network.

At 712, where the leaf flag value is not set, the decision tree processor, e.g., a feature circuit or stage of a decision tree processor pipeline, reads the feature value identified by the feature indicator from feature storage.

At 714, the decision tree processor, e.g., the feature circuit or stage of a decision tree processor pipeline, pre-computes possible next decision tree node addresses based on the next node data, such as offset values and the next decision tree nodes that are adjacent to currently executing nodes. The decision tree processor, e.g., the feature circuit or stage of a decision tree processor pipeline, also or alternatively pre-computes addresses for right or left leaf data, such as right or left leaf words or values of the current decision tree node. As noted elsewhere within this Detailed Description, a subset of the nodes of the decision tree node table includes one or more leaf values. The presence of leaf nodes indicates that a possible outcome of the execution of the decision node is to select to output a leaf value the next time the thread passes through the pipeline. Thus, the decision tree processor pre-computes one of a left leaf data address or a left next node address, and one of a right leaf data address or a right next node address, depending on whether there is a left leaf or left next node, and based on whether there is a right leaf value or a right next node in the particular decision node being executed. Pre-computation at 714 occurs prior to the execution of the decision node by the decision tree processor.

Pre-computation of some of the next node addresses is performed, in some embodiments, by processing next node data, such as an offset value of the decision tree node, such as by adding the offset value to location of the current node to arrive at a location of the next node. The next node data, such as an offset value, is either separate next node data, such as an offset value, provided within the decision node, or coded by the info field of the decision node, as described elsewhere within this Detailed Description. Pre-computing the next node addresses is also based on adjacencies for some of the next node addresses.

At 716, the decision tree processor, e.g., an execution circuit or stage of the decision tree processor pipeline, executes the decision tree node. Executing the decision tree node includes comparing a threshold value of the decision tree node to the feature value retrieved from the feature storage. The threshold value may be a threshold index value, and the feature value may be a feature index value, as described elsewhere within this Detailed Description.

At 718, the decision tree processor, e.g., the execution circuit or stage of the decision tree processor pipeline, determines the next decision tree node for the thread to be retrieved and executed and/or an address of leaf data containing a leaf value to be output the next time the thread is fetched into the pipeline. Selection of the next decision tree node or address of leaf data are determined based on an outcome of executing the decision tree node. Some outcomes of the comparisons (such as where the feature value is less than or equal to the threshold value) result in determining the next decision tree node based on the next node data, such as a next node offset value. Other outcomes of the comparisons (such as where the feature value is not less than or equal to the threshold value) result in determining the next decision tree node that is adjacent to currently executing node within a decision tree table associated with the decision tree within the decision tree processor.

At 720, a determination is made by the decision tree processor, e.g., by the thread circuit or stage of the decision tree processor, whether all threads have been retired. As threads output leaf values at 710 and are completed, they are de-linked at 708 from a linked list of decision tree threads. When all threads are de-linked, the decision tree executions in this decision tree processor 124 are complete. Each thread corresponds to a single decision tree; thus once all threads are completed, the decision tree processor outputs a completion signal and outputs one or more scores from the decision tree execution.

Figure 8:
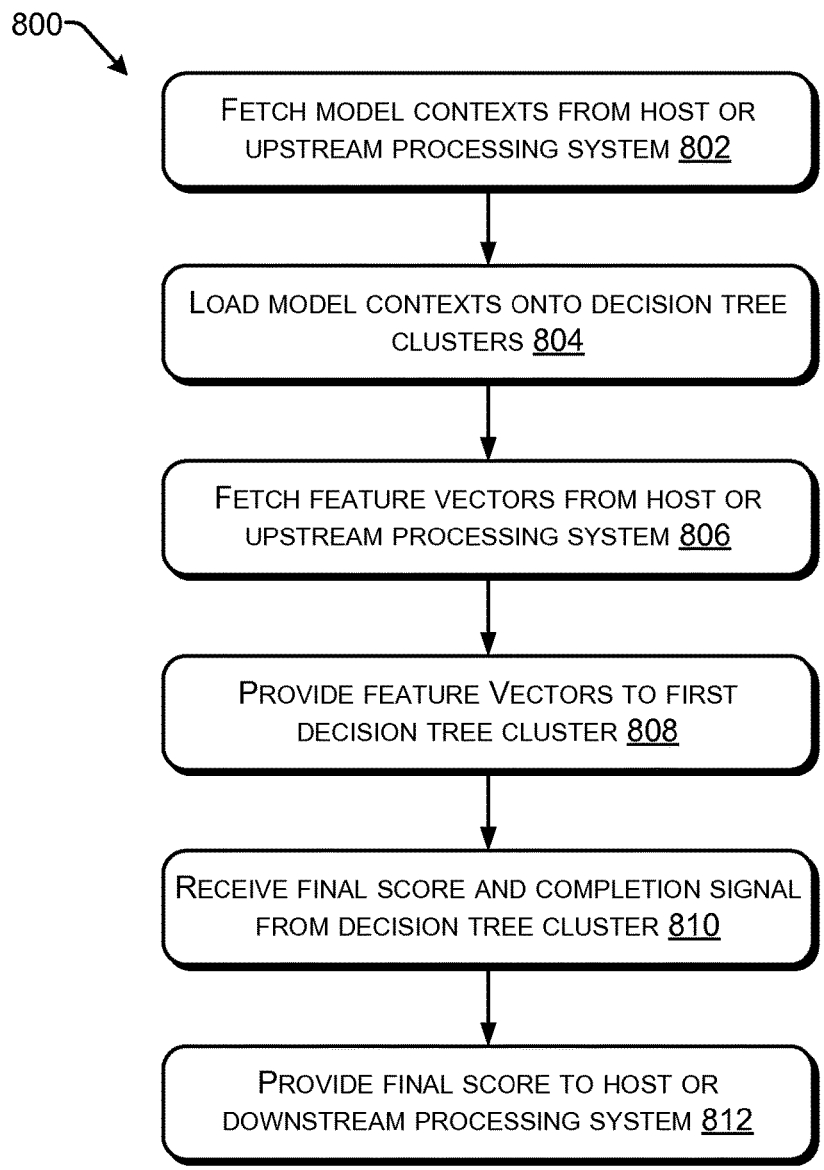
FIG. 8 illustrates a process of scoring feature vectors a plurality of decision trees by a decision tree scorer, in accordance with various embodiments.

FIG. 8 illustrates a process 800 of scoring a plurality of decision trees by a decision tree scorer, in accordance with various embodiments. At 802, the decision tree scorer 102 receives a model context 108 from a host 104 or other upstream processing system. At 804, the decision tree scorer 102 loads the model context 108 onto the plurality of decision tree clusters 122.

At 806, the decision tree scorer 102 receives a feature vector 112 from the host 104 or from an upstream processing system. At 808, the decision tree scorer 102 provides the feature vector 112 to a first one of the decision tree clusters 122. Thus, in some embodiments, a common feature vector is provided to the decision tree clusters 122 and the decision tree processors 124.

At 810, the decision tree scorer 102 receives a final score and a completion signal from one of the decision tree clusters 122, indicating that the decision tree clusters have completed the scoring of feature vector with the plurality of decision trees. At 812, the decision tree scorer 102 provides the final score to the host 104 or a downstream processing system, which may include in some embodiments another decision tree scorer or other system.

Figure 9:
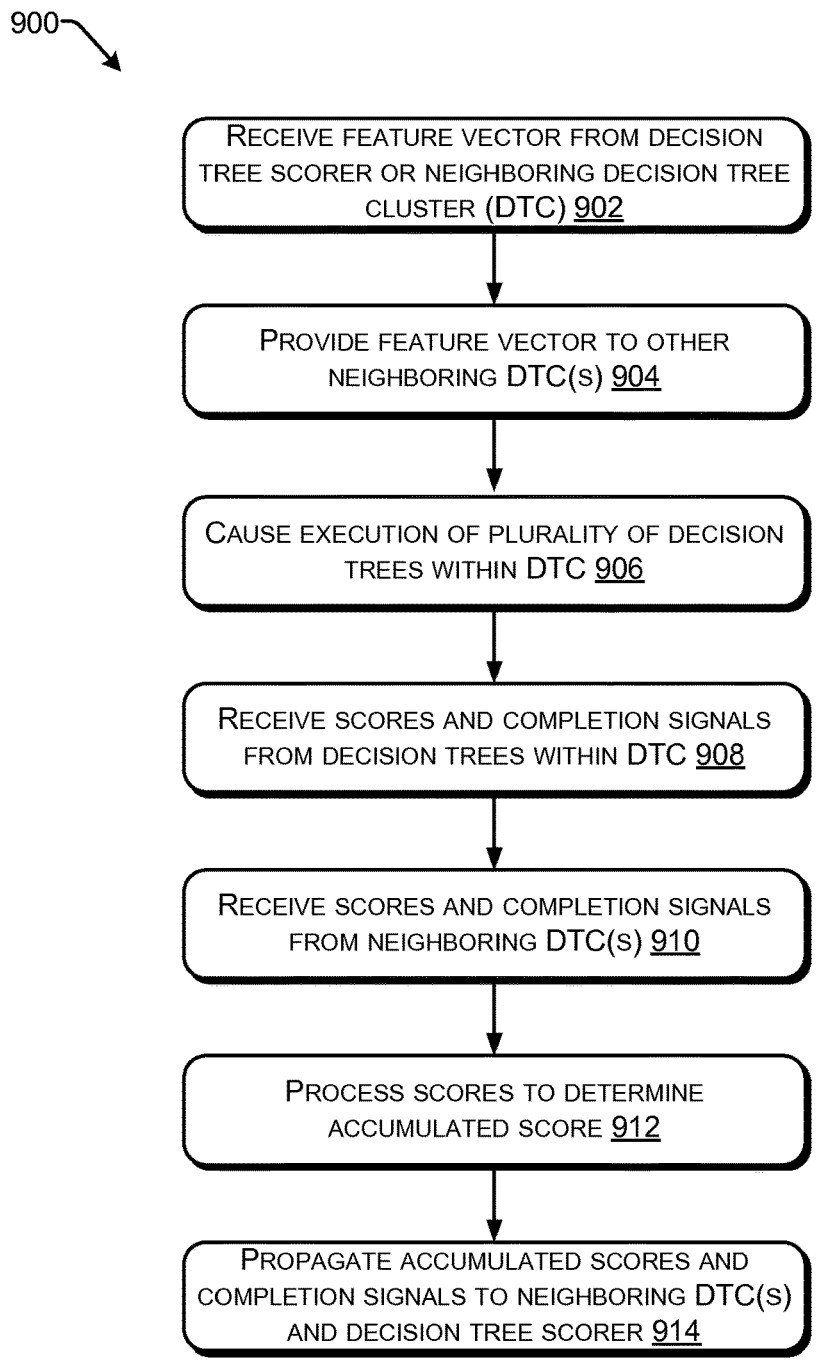
FIG. 9 illustrates a process of scoring a plurality of decision trees by decision tree clusters, in accordance with various embodiments.

FIG. 9 illustrates a process 900 of scoring a plurality of decision trees by decision tree clusters, in accordance with various embodiments. At 902, the decision tree clusters (DTCs) 122 receive a feature vector (such as a common feature vector) from the decision tree scorer 102 or from neighboring DTCs 122. At 904, the DTCs 122 provide the feature vector to other neighboring DTCs 122. In this manner, the feature vector is distributed to all DTCs within a decision tree scorer.

At 906, the decision tree clusters 122 cause the plurality of decision tree processors 124 within a plurality of DTCs 122 to begin execution of the plurality of decision trees within the model contexts loaded onto the DTCs 122. The execution of the plurality of decision trees may be concurrent, and may be performed by multi-threaded, multi-stage pipelined decision tree processors. Execution of the decision trees includes, among other things, comparisons of threshold values (or threshold index values) to feature values (or feature index values) of a common feature vector, and selection of next nodes and/or output values based on the comparisons. The execution of the decision trees results in corresponding scores for ones of the plurality of decision trees.

At 908, the DTCs 122 receive from the decision tree processors 124 the corresponding scores and completion signals resulting from the execution of the decision trees on the decision tree processors 124. At 910, the DTCs 122 receive scores and completion signals from neighboring DTCs 122.

At 912, based on receipt of the completion signals and the scores, the DTCs 122 process the scores from the decision tree processors 124 within the DTCs 122 with scores from the neighboring DTCs 122. For example, the DTCs 122 may sum the scores to produce an accumulated score. In another example, the DTCs 122 may append the scores, or a sum of the scores from the decision tree processors 124 within the DTCs 122, to the score data received from the neighboring DTCs 122.

At 914, the DTCs 122 propagate the accumulated scores and completion signals to neighboring DTCs 122, eventually reaching the final one of the DTCs 122, which provides a final score to the decision tree scorer 102. In this way, the individual scores from each of the decision trees executing on the decision tree processors 124 within each of the DTCs 122 are accumulated into final score data, such as a final sum of scores or list or set of scores from individual ones of the decision tree processors and propagated to the decision tree scorer 102.

Figure 10:
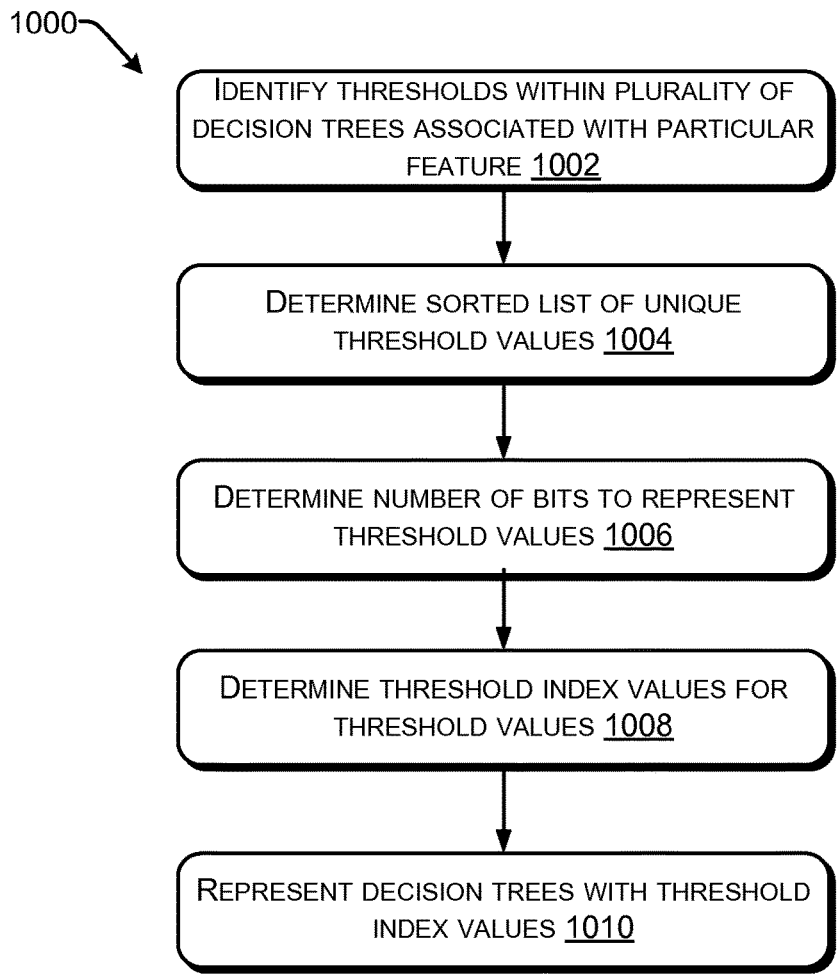
FIG. 10 illustrates a process of coding threshold values of a plurality of decision trees in accordance with various embodiments.

FIG. 10 illustrates a process 1000 of coding threshold values of a plurality of decision trees in accordance with various embodiments. At 1002, a decision tree coder 106 identifies all threshold values referenced in all decision nodes of a plurality of decision trees—such as those within a model context 108—that correspond to a particular feature.

At 1004, the decision tree coder 106 determines a list of unique threshold values associated with the particular feature in the one or more decision trees. In some embodiments, the list is sorted, such as in ascending or descending order. At 1006, the decision tree coder 106 determines a number of bits to be used to represent threshold index values for the threshold values based at least in part on a number of values in the sorted list of unique threshold values associated with the particular feature in the one or more decision trees.

In one particular example, where the base-2-logarithm of the total number of threshold values associated with the particular feature is less than 4, the threshold index is coded as a 4-bit word, and where the base-2-logarithm of the total number of threshold values associated with the particular feature is less than 8, the threshold index is coded as a 8-bit word. Where the base-2-logarithm of the total number of threshold values associated with the particular feature is greater than 8, multiple features are used to represent the particular feature in the coded decision tree, such that the number of features to represent the particular feature is determined by n/255, where n is equal to the total number of threshold values associated with the particular feature, as described elsewhere within this Detailed Description. 8-bit words are used to represent the threshold values for these multiple features. In other embodiments, the decision tree is modified to include multiple decision nodes in place of one node with a number of unique thresholds exceeding a predetermined value. Other examples are possible without departing from the scope of embodiments.

At 1008, the decision tree coder 106 determines a plurality of threshold index values for the list of unique threshold values. In some embodiments, index values are assigned to the sorted list, such that threshold index values associated with smaller threshold values are smaller than threshold index values associated with larger threshold values, although larger index values are assigned to smaller threshold values in other embodiments. In one particular example, the smallest one of the unique threshold values is assigned a threshold index value of 0, and the largest one is assigned a threshold index value that is equal to the total number of unique threshold values minus one. Other examples are possible without departing from the scope of embodiments.

At 1010, the decision tree coder 106 represents the one or more decision trees such that decision nodes of the one or more decision trees associated with the particular feature include the threshold index values. The process 1000 is repeated for each feature referenced in at least one decision node of a plurality of decision trees until all threshold values in the plurality of decision trees are coded with threshold index values.

Figure 11:
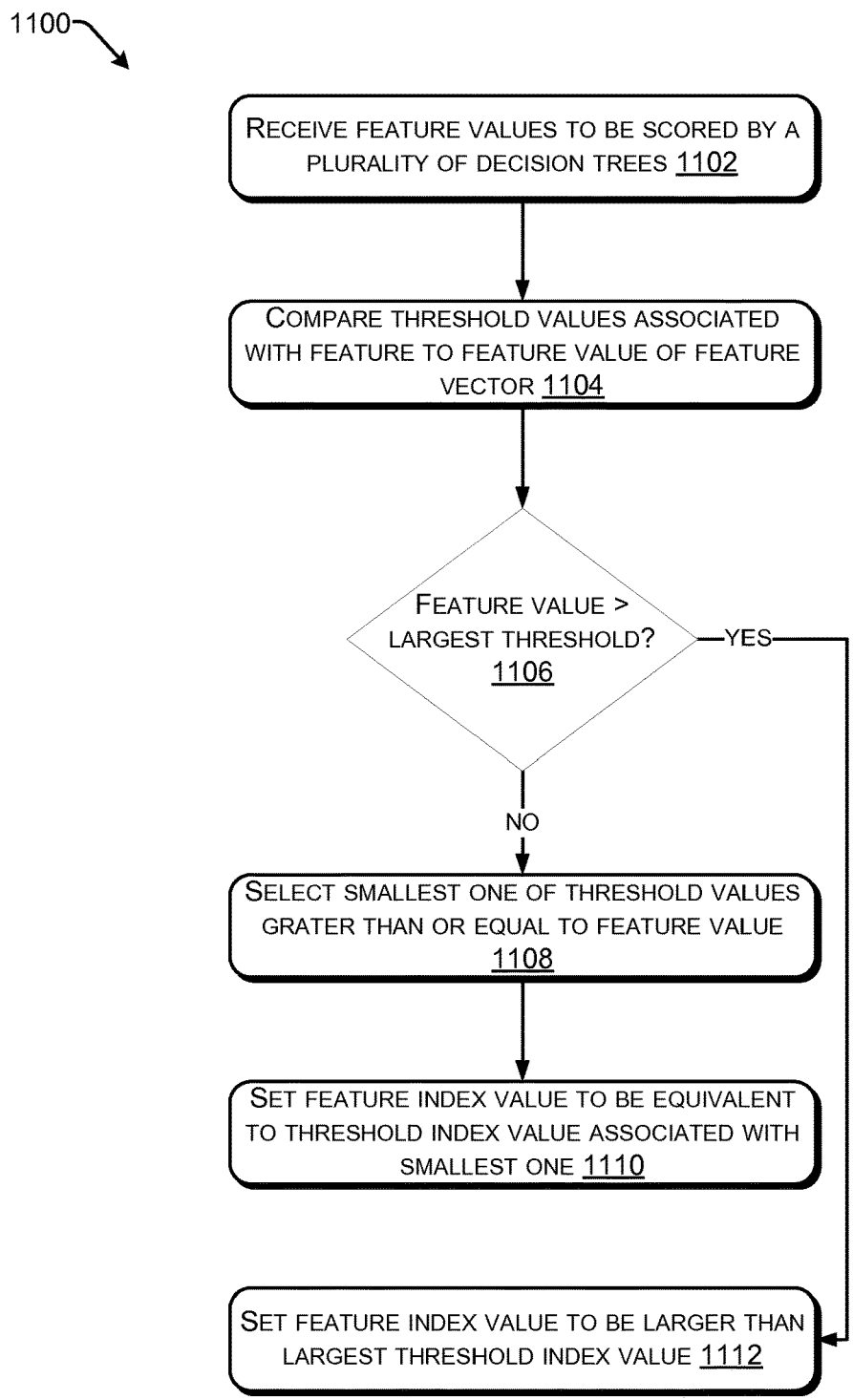
FIG. 11 illustrates a process of coding a set of feature values, in accordance with various embodiments.

FIG. 11 illustrates a process 1100 of coding a vector of feature values, in accordance with various embodiments. As described above with respect to FIG. 10, threshold values for each feature are coded. Feature values for feature vectors that are to be scored against the set of coded decision trees are coded such that the feature values are compatible with the coded threshold values. At 1102, a feature vector coder 110 receives a feature vector 112 to be scored by a plurality of decision trees.

At 1104, a feature vector coder 110 compares a feature value associated with the particular feature to the threshold values that correspond to the particular feature (e.g., to the list $ts_i$ described above). At 1106, a determination is made by the feature vector coder 110 as to whether the feature value corresponding to the particular feature in the feature vector is greater than the largest threshold value in the set of threshold values associated in the plurality of decision trees with the particular feature.

At 1108, upon determining that the feature value is not larger than the largest threshold value (the "NO" path), the feature vector coder 110 identifies a smallest one of the list of unique threshold values that is greater than or equal to the feature value.

At 1110, the feature vector coder 110 codes the feature value to produce a coded feature value (e.g., a feature index value) that is equal to a particular one of the sorted threshold index values that corresponds to the smallest one of the sorted list of unique threshold values.

At 1112, upon determining that the feature value is larger than the largest threshold value (the "YES" path), feature vector coder 110 sets the feature index value to be larger than the largest threshold index value. In one particular example, the feature index value is set to be equal to the total number of unique threshold values associated with the feature, but any number larger than the largest threshold index value could be used. In this way, the feature index values are set such that outcomes of comparisons of the threshold index values to corresponding feature index values during decision tree execution (such as by the decision tree processors 124) are equivalent to outcomes of comparisons of corresponding threshold values to corresponding feature values.

The operations of the example processes of FIGS. 7-11 are illustrated in individual blocks and summarized with reference to those blocks. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Example Computing System

Figure 12:
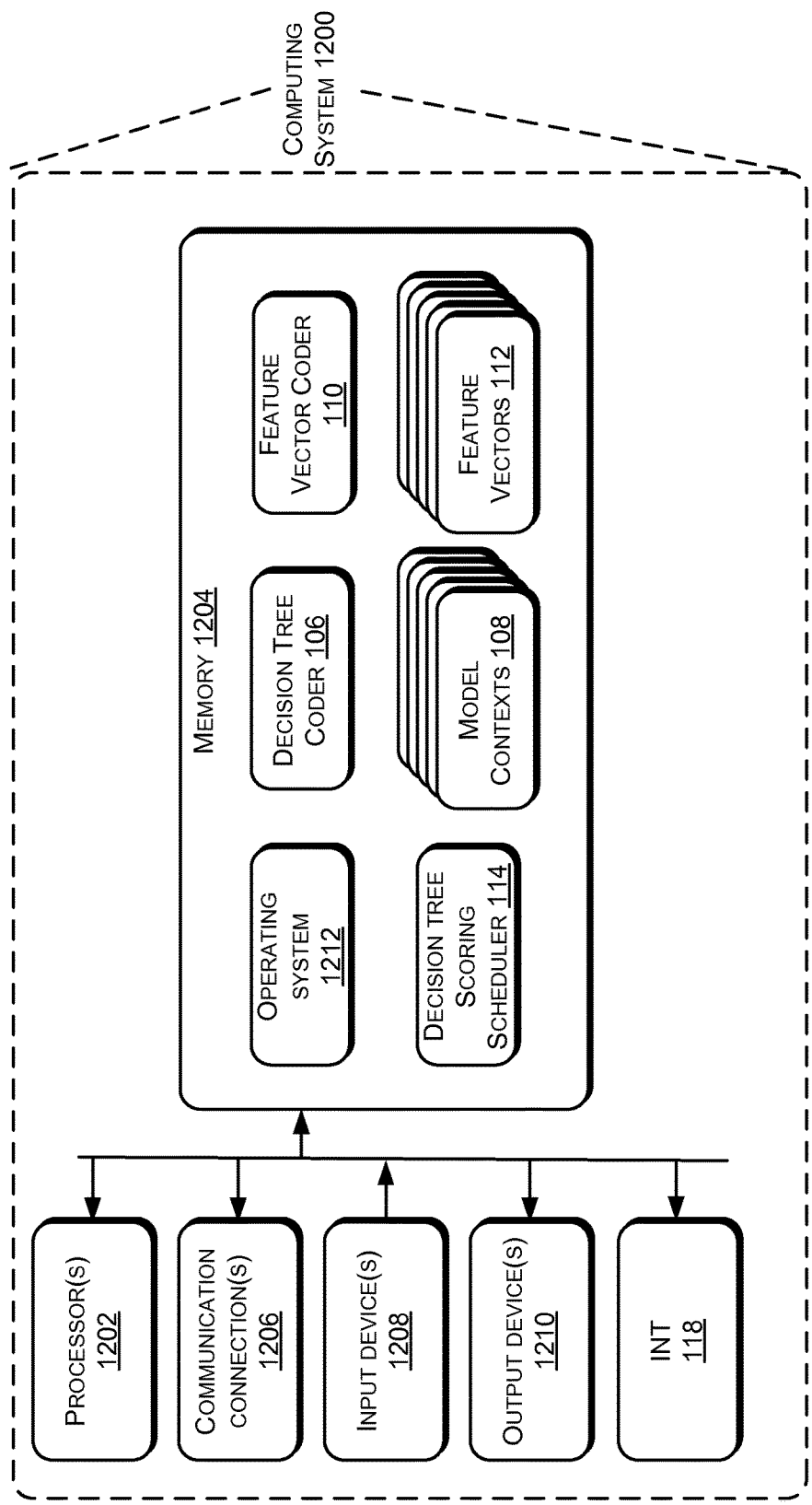
FIG. 12 is a block diagram of an example computing system usable to perform various methods described herein.

FIG. 12 is a block diagram of an example computing system 1200 usable to perform various methods described herein. The computing system 1200 may be configured as any suitable computing device capable of implementing all or part of a decision tree scoring system, such as the host 104. According to various non-limiting examples, suitable computing devices may include personal computers (PCs), handheld devices, wearable smart devices, smartphones, tablet computers, laptop computers, desktop computers, gaming systems, electronic media players (such as mp3 players and e-book readers), servers, server farms, datacenters, special purpose computers, combinations of these, or any other computing device(s) capable of storing and executing all or part of the decision tree scoring system described herein.

In one example configuration, the computing system 1200 comprises one or more processors 1202 and memory 1204. The computing system 1200 may also contain communication connection(s) 1206 that allow communications with various other systems. The computing system 1200 may also include one or more input devices 1208, such as a keyboard, mouse, pen, voice input device, touch input device, etc., and one or more output devices 1210, such as a display, speakers, printer, etc. coupled communicatively to the processor(s) 1202 and the memory 1204.

The memory 1204 may store program instructions that are loadable and executable on the processor(s) 1202, as well as data generated during execution of, and/or usable in conjunction with, these programs. In the illustrated example, memory 1204 stores an operating system 1212, which provides basic system functionality of the computing system 1200 and, among other things, provides for operation of the other programs and program modules of the computing system 1200.

Computer-Readable Media

Depending on the configuration and type of computing device used, memory 1204 of the computing system 1200 in FIG. 12 may include volatile memory (such as random access memory (RAM)) and/or non-volatile memory (such as read-only memory (ROM), flash memory, etc.). Memory 1204 may also include additional removable storage and/or non-removable storage including, but not limited to, flash memory, magnetic storage, optical storage, and/or tape storage that may provide non-volatile storage of computer-readable instructions, data structures, program modules, and other data for computing system 1200.

Memory 1204 is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

Conclusion

Although the disclosure uses language that is specific to structural features and/or methodological acts, the invention is not limited to the specific features or acts described. Rather, the specific features and acts are disclosed as illustrative forms of implementing the invention.

What is claimed is:

1. A decision tree scoring hardware system comprising:
a plurality of decision tree clusters arranged in a grid on a programmable integrated circuit, wherein each of the plurality of decision tree cluster comprises:
plurality of decision tree processors each having one or more decision trees executable in parallel;
a doubled-buffered feature storage configured to concurrently write a first set of common feature vectors to the feature storage and to provide access to a second set of common feature vectors, stored in the feature storage, for each of the plurality of decision tree processors;
wherein two or more of the plurality of decision tree clusters each having a first plurality of entire decision trees are configured to receive score data generated by execution of a second plurality of entire decision trees from an adjacent one of the plurality of decision tree clusters; and
wherein each of the two or more of the plurality of decision tree clusters is configured to process the received score data with generated score data from the first plurality of entire decision trees within the decision tree cluster to produce combined score data.

2. The decision tree scoring hardware system of claim 1, wherein, for each of the plurality of decision tree clusters, a first one of the plurality of decision tree processors further executes a first one of the decision trees with respect to the second set of common feature vectors concurrently with execution of a second one of the decision trees with respect to the second set of common feature vector by a second one of the decision tree processors.

3. The decision tree scoring hardware system of claim 1, wherein each of the two or more of the plurality of decision tree clusters further processes the received score data and the generated score data by one of:
appending the received score data to the generated score data to produce the combined score data; or
summing the received score data and the generated score data to produce the combined score data.

4. The decision tree scoring hardware system of claim 1, wherein, for each of the plurality of decision tree clusters, at least one of the decision tree processors outputs scores based on outcomes of execution of the one or more decision trees, the decision tree scoring hardware system further comprising:
   a score aggregation network to collect scores output by the decision tree processors.

5. The decision tree scoring hardware system of claim 1, further comprising one or both of:
   a subset of the plurality of decision tree clusters comprising subsets of decision tree processors, wherein a first one of the subset of the plurality of decision tree clusters receives a common set of features from a second one of the subset of the plurality of decision tree clusters and propagates the common set of features to a third one of the subset of the plurality of decision tree clusters; or
   a feature network coupled to the plurality of decision tree processors of each of the plurality of decision tree clusters to provide the common set of features to each of the plurality of decision tree processors of each of the plurality of decision tree clusters.

6. The decision tree scoring hardware system of claim 1, wherein, for each of the plurality of decision tree clusters, the plurality of decision tree processors further comprises a plurality of multi-threaded decision tree processors that concurrently execute a plurality of decision trees in multi-threaded processes.

7. The decision tree scoring hardware system of claim 1, wherein the two or more of the plurality of decision tree clusters comprise a pattern of decision tree clusters in the plurality of decision tree clusters configured to avoid receiving the score data from two adjacent decision tree clusters into which the same score data have been processed.

8. A method, comprising:
   providing a plurality of decision tree clusters arranged in a grid on a programmable integrated circuit;
   providing a plurality of decision tree processors in each of the plurality of decision tree clusters;
   providing a double-buffered feature storage in each of the plurality of decision tree clusters;
   concurrently writing a first common feature vector to the double-buffered feature storage in each of a plurality of decision tree clusters arranged in a grid on a programmable integrated circuit, each of the plurality of decision tree clusters having a plurality of decision tree processors implemented within an on-chip decision tree scoring system;
   providing a second common feature vector to each of the plurality of decision tree processors executing in parallel, on each of the plurality of decision tree processors, one or more decision trees, by reference to the second common feature vector;
   receiving, by two or more of the plurality of decision tree clusters each having a first plurality of entire decision trees, score data generated by execution of a second plurality of entire decision trees from an adjacent one of the plurality of decision tree clusters; and
   processing, by each of two or more of the plurality of decision tree clusters, the received score data with generated score data from the first plurality of entire decision trees within the decision tree cluster to produce combined score data.

9. The method of claim 8, further comprising concurrently executing, by the plurality of decision tree processors of each of the plurality of decision tree clusters, the plurality of decision trees by reference to the second common feature vector.

10. A method of claim 8, further comprising:
    outputting, into a score aggregation network, scores for at least one of the plurality of decision trees of each of the plurality of decision tree clusters based on outcomes of executing the plurality of decision trees.

11. The method of claim 8, the method further comprising concurrently, for each of the plurality of decision tree clusters:
    loading a third feature vector into the feature storage; and
    executing, by at least one of the decision tree processors, at least one of the plurality of decision trees, the executing including reading one or more features of the third common feature vector from the feature storage.

12. The method of claim 8, further comprising:
    propagating the first common feature vector throughout the plurality of decision tree clusters, the propagating including receiving the first common feature vector from first neighboring decision tree clusters; and
    passing, by at least one of the plurality of decision tree clusters, the first common feature vector to second neighboring decision tree clusters.

13. The method of claim 8, wherein the two or more of the plurality of decision tree clusters comprise a pattern of decision tree clusters in the plurality of decision tree clusters configured to avoid receiving the score data from two adjacent decision tree clusters into which the same score data have been processed.

14. A decision tree-walking system, comprising:
    a plurality of decision tree clusters arranged in a grid on a programmable integrated circuit;
    a plurality of decision tree processors in each of the plurality of decision tree clusters, wherein each of the plurality of decision tree processors includes one or more decision trees executable in parallel; and
    double-buffered feature storage in each of the plurality of decision tree clusters configured to concurrently:
        store a first common feature vector to the feature storage; and
        provide access to a second common feature vector stored in the feature storage by each of the plurality of decision tree processors;
    wherein two or more of the plurality of decision tree clusters each having a first plurality of entire decision trees are configured to receive score data generated by execution of a second plurality of entire decision trees from an adjacent one of the plurality of decision tree clusters; and
    wherein the two or more of the plurality of decision tree clusters are configured to process the received score data with generated score data from the first plurality of entire decision trees within the decision tree cluster to produce combined score data.

15. The decision tree-walking system of claim 14, further comprising:
    a second feature storage that stores the first common feature vector; and
    a second plurality of decision tree processors that
        accesses the first common feature vector from the second feature storage; and
        executes a second plurality of decision trees by comparing threshold values of the second plurality of decision trees to the feature values within the first common feature vector.

16. The decision tree-walking system of claim 14, concurrently writing a third common feature vector to the feature storage with the access of the second common feature vector by the plurality of decision tree processors.

17. The decision tree-walking system of claim 14, wherein the feature storage and the plurality of decision tree processors are first feature storage and a first plurality of decision tree processors included in one of a first programmable logic device, a first application-specific integrated circuit, or a first on-chip processor with a first enhanced instruction set, and the decision tree-walking system further includes:

one of a second programmable logic device, a second application-specific integrated circuit, or a second on-chip processor with a second enhanced instruction set that includes:
- a second feature storage to store the first common feature vector; and
- a second plurality of decision tree processors that accesses the first common feature vector from the second feature storage and executes a third plurality of entire decision trees by comparing second threshold values of the third plurality of entire decision trees to the feature values within the first common feature vector;

the second programmable logic device, second application-specific integrated circuit, or second on-chip processor with the second enhanced instruction set configured to:
- receive first score data from one of the first programmable logic device, first application-specific integrated circuit, or first on-chip processor with the first enhanced instruction set, the first score data resulting from execution of the second plurality of entire decision trees; and
- process the first score data with second score data resulting from execution of the third plurality of entire decision trees to produce combined score data for the first common feature vector.

18. The decision tree-walking system of claim 14, wherein the two or more of the plurality of decision tree clusters comprise a pattern of decision tree clusters in the plurality of decision tree clusters configured to avoid receiving the score data from two adjacent decision tree clusters into which the same score data have been processed.

* * * * *